(12) United States Patent
Wang et al.

(10) Patent No.: US 12,526,345 B2
(45) Date of Patent: Jan. 13, 2026

(54) EDGE AWARE DISTRIBUTED NETWORK

(71) Applicant: CONVIDA WIRELESS, LLC, Wilmington, DE (US)

(72) Inventors: Chonggang Wang, Princeton, NJ (US); Dale Seed, Allentown, PA (US); Xu Li, Plainsboro, NJ (US); Lu Liu, Conshohocken, PA (US); Michael Starsinic, Newtown, PA (US); Hongkun Li, Malvern, PA (US)

(73) Assignee: CONVIDA WIRELESS, LLC, Wilmington, DE (US)

( * ) Notice: Subject to any disclaimer, the term of this patent is extended or adjusted under 35 U.S.C. 154(b) by 0 days.

(21) Appl. No.: 18/597,613

(22) Filed: Mar. 6, 2024

(65) Prior Publication Data

US 2024/0214468 A1 Jun. 27, 2024

Related U.S. Application Data

(63) Continuation of application No. 17/789,609, filed as application No. PCT/US2020/067291 on Dec. 29, 2020, now Pat. No. 11,956,332.

(Continued)

(51) Int. Cl.
*H04L 67/60* (2022.01)
*H04W 84/04* (2009.01)

(52) U.S. Cl.
CPC .......... *H04L 67/60* (2022.05); *H04W 84/042* (2013.01)

(58) Field of Classification Search
CPC .... H04L 67/60; H04L 63/166; H04W 84/042; H04W 8/08; H04W 24/02; H04W 24/10
See application file for complete search history.

(56) References Cited

U.S. PATENT DOCUMENTS

2011/0086628 A1* 4/2011 Karuturi ............. H04Q 3/0029
455/418
2012/0254173 A1 10/2012 Graefe
(Continued)

FOREIGN PATENT DOCUMENTS

| CN | 109155949 A | 1/2019 |
| CN | 109891962 A | 6/2019 |

(Continued)

OTHER PUBLICATIONS

"Technical Specification Group Services and System Aspects; Study on support of the 5GMSG Service," 3rd Generation Partnership Project, 3GPP TR 23.700-24 V0.1.0, (Release 17), Aug. 2019, pp. 13.

(Continued)

*Primary Examiner* — Brian J. Gillis
*Assistant Examiner* — Thao D Duong
(74) *Attorney, Agent, or Firm* — BakerHostetler

(57) ABSTRACT

System and methods that improve the use of network functions on edge data networks are disclosed. A mechanism that supports edge-assisted UE context and trigger collection is described herein, where a UE can actively send its context information and/or any trigger (e.g. a request for a network function/service to be deployed in edge data networks, etc.) to an edge enabler server, which processes the received context and triggers from its UEs. The edge enabler server may also forward UE context and triggers to 5G core network (5GC) upon receiving a solicitation request from the 5GC, or if the 5GC has already made a subscription for getting notification on UE context and triggers. A network repository function is provided as a new network function collect, store, and manage edge data network information.

12 Claims, 32 Drawing Sheets

Related U.S. Application Data

(60) Provisional application No. 62/955,706, filed on Dec. 31, 2019.

(56) References Cited

U.S. PATENT DOCUMENTS

| | | | |
|---|---|---|---|
| 2014/0365523 A1* | 12/2014 | Wagner | G06F 16/951 707/770 |
| 2015/0312351 A1 | 10/2015 | Wang et al. | |
| 2016/0198001 A1* | 7/2016 | Um | H04L 67/125 709/205 |
| 2018/0376384 A1 | 12/2018 | Youn et al. | |
| 2019/0090166 A1* | 3/2019 | Lu | H04W 36/0033 |
| 2019/0273790 A1* | 9/2019 | Zhao | H04L 51/046 |
| 2019/0339840 A1* | 11/2019 | Park | G10L 15/00 |
| 2020/0053685 A1 | 2/2020 | Chandramouli et al. | |
| 2020/0053802 A1 | 2/2020 | Li et al. | |
| 2020/0084291 A1* | 3/2020 | Ando | H04N 1/00474 |
| 2020/0242001 A1 | 7/2020 | McHugh et al. | |
| 2021/0168695 A1 | 6/2021 | Ryu et al. | |
| 2021/0173887 A1 | 6/2021 | Petersen et al. | |
| 2021/0176613 A1* | 6/2021 | Purkayastha | H04W 4/02 |
| 2021/0227049 A1 | 7/2021 | Demiralp et al. | |
| 2022/0174585 A1* | 6/2022 | Ge | H04L 61/4541 |
| 2023/0037031 A1* | 2/2023 | Wang | H04W 8/08 |

FOREIGN PATENT DOCUMENTS

| | | |
|---|---|---|
| CN | 109997334 A | 7/2019 |
| CN | 110024326 A | 7/2019 |
| WO | 2019/032968 A1 | 2/2019 |

OTHER PUBLICATIONS

3GPP TR 23.748 V0.2.0 (Dec. 2019); 3rd Generation Partnership Project; Technical Specification Group Services and System Aspects; Study on enhancement of support for Edge Computing in the 5G Core network (5GC) (Release 17).

3GPP TR 23.758 V1.0.0 (Sep. 2019); Technical Specification Group Services and System Aspects; Study on application architecture for enabling Edge Applications; (Release 17).

3GPP TR 28.803 V1.1.0 (Jul. 2019); Technical Specification Group Services and System Aspects; Telecommunication management; Study on management aspects of edge computing (Release 16).

3GPP TS 22.262 V16.0.0 (Jan. 2019); Technical Specification Group Services and System Aspects; Message Service within the 5G System; Stage 1 (Release 16).

3GPP TS 23.288 V16.0.0 (Jun. 2019); Technical Specification Group Services and System Aspects; Architecture enhancements for 5G System (5GS) to support network data analytics services (Release 16).

3GPP TS 23.502 V16.1.1 (Jun. 2019); 3rd Generation Partnership Project; Technical Specification Group Services and System Aspects; Procedures for the 5G System; Stage 2 (Release 16).

3rd Generation Partnership Project; Technical Specification Group Services and System Aspects; Study of Enablers for Network Automation for 5G (Release 16), 3GPP Standard; Technical Report; 3GPP TR 23.791, 3rd Generation Partnership Project (3GPP), Mobile Competence Centre; vol. SA WG2, No. VI6.1.0, Mar. 25, 2019, pp. 1-124.

3rd Generation Partnership Project; Technical Specification Group Services and System Aspects; Study on support of the 5GMSG Service; (Release 17), 3GPP Draft; 23700-24-030, 3rd Generation Partnership Project (3GPP), Mobile Competence Centre; Dec. 12, 2019, XP051845830.

3rd Generation Partnership Project; Technical Specification Group Services and System Aspects; System Architecture for the 5G System; Stage 2 (Release 15), 3GPP Standard; Technical Specification; 3GPP TS 23.501, 3rd Generation Partnership Project (3GPP), Mobile Competence Centre; vol. SA WG2, No. V15.1.0, Mar. 28, 2018, pp. 1-201.

Huawei et al., "TS 23.501: Clarifications of Context Awareness and Network Function Exposure Capabilities", S2-172131, Mar. 2017, pp. 1-3.

\* cited by examiner

EDGE AWARE DISTRIBUTED NETWORK

CROSS-REFERENCE TO RELATED APPLICATIONS

This application is a continuation of U.S. application Ser. No. 17/789,609, filed Jun. 29, 2022, which is the National Stage Application of International Patent Application No. PCT/US2020/067291, filed Dec. 29, 2020, which claims the benefit of U.S. Provisional Patent Application No. 62/955,706, filed Dec. 31, 2019, which are hereby incorporated by reference in their entirety.

BACKGROUND

The 5G System (5GS) architecture includes of a set of Network Functions (NFs) and network entities. The 5G Core (5GC) network utilizes service-based principles, where each NF could be a service provider or a service consumer. As a service provider, a NFx includes of a set of services (or functionalities) and provides a Service-Based Interface (SBI), through which other NFs as service consumers can access those services. For the security protection at the transport layer, the 3GPP NFs support Transport Layer Security (TLS) and the TLS is used within a Public Land Mobile Network (PLMN) if network security is not provided by other means.

In order to use services provided by a NF service provider, a NF service consumer first needs to discover the NF service provider and its services. In order to be discovered by a NF service consumer, a NF service provider first needs to register itself to a repository. For example, a Network Data Analytics Function (NWDAF) provides Nnwdaf interface with two services: Nnwdaf_AnalyticsSubscription and Nnwdaf_AnalyticsInfo. Nnwdaf_AnalyticsSubscription enables NF service consumers to subscribe/unsubscribe for different types of analytics from NWDAF.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

System and methods that improve the use of network functions on edge data networks are disclosed. A mechanism that supports edge-assisted UE context and trigger collection is described herein, where a UE can actively send its context information and/or any trigger (e.g. a request for a network function/service to be deployed in edge data networks, etc.) to an edge enabler server, which will process the received context and triggers from all its UEs. The edge enabler server can also forward UE context and triggers to 5GC upon receiving a solicitation request from 5GC or if 5GC has already made a subscription for getting notification on UE context and triggers. A network repository function is provided as a new network function collect, store, and manage edge data network information. NF consumers can discover edge data networks and edge servers from an Edge Network Repository Function (ENRF). An edge-assisted distributed network function solution is configured to distribute network functions from 5GC to edge data networks to facilitate UEs and edge applications with higher efficiency such as reduced latency for accessing network functions. An edge-assisted message service over 5G systems enables MSGin5G to leverage edge data network to improve the message delivery efficiency, especially for point-to-point messages.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHZ, and the provision of new ultra-mobile broadband radio access above 6 GHz. The flexible radio access is expected to consist of a new, non-backwards compatible radio access in new spectrum below 6 GHZ, and it is expected to include different operating modes that may be multiplexed together in the same spectrum to address a broad set of 3GPP NR use cases with diverging requirements. The ultra-mobile broadband is expected to include cm Wave and mm Wave spectrum that will provide the opportunity for ultra-mobile broadband access for, e.g., indoor applications and hotspots. In particular, the ultra-mobile broadband is expected to share a common design framework with the flexible radio access below 6 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 1A:
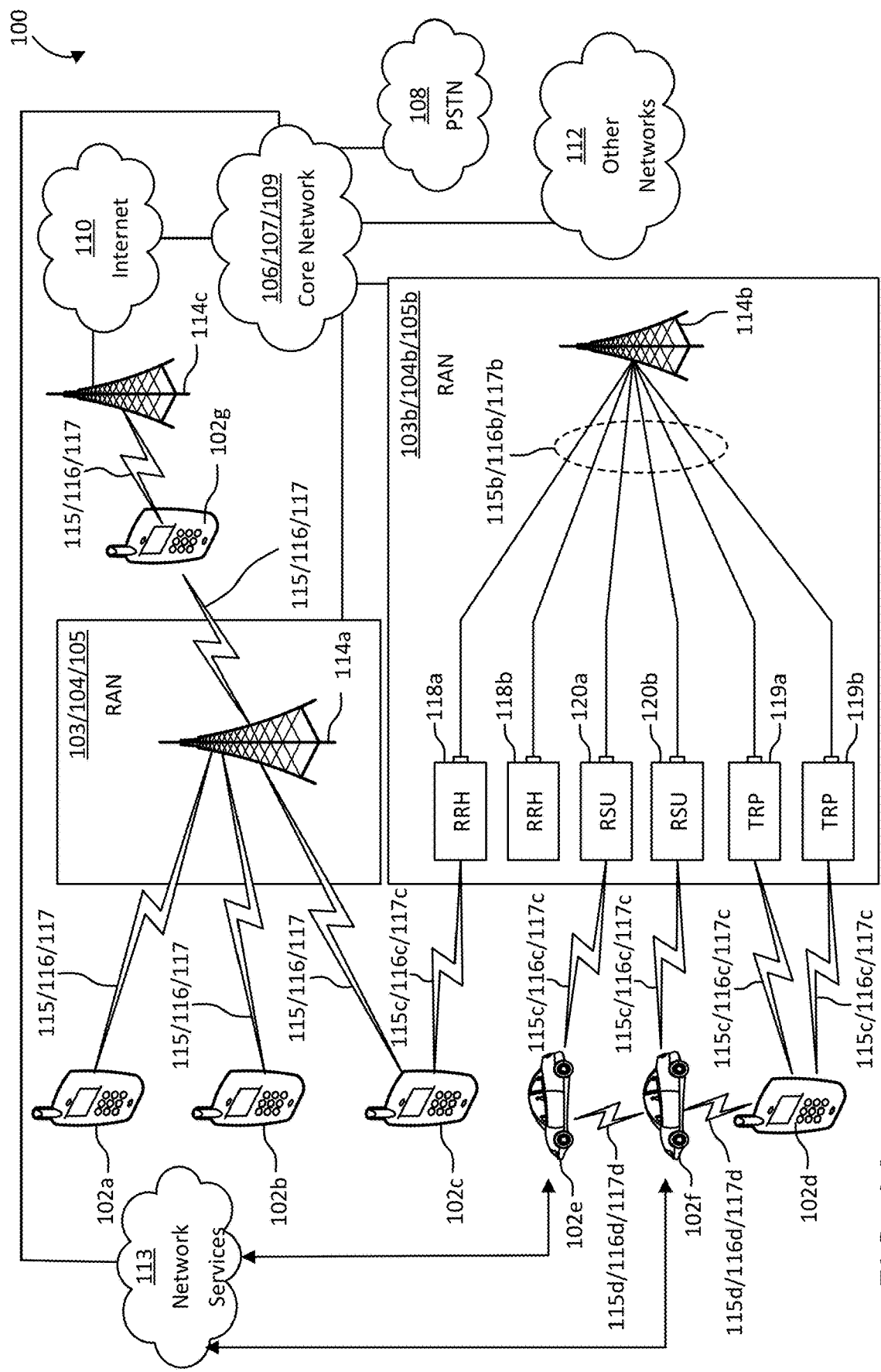
FIG. 1A illustrates an example communications system in which the methods and apparatuses described and claimed herein may be embodied.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in Figures IA-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cm Wave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VOIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
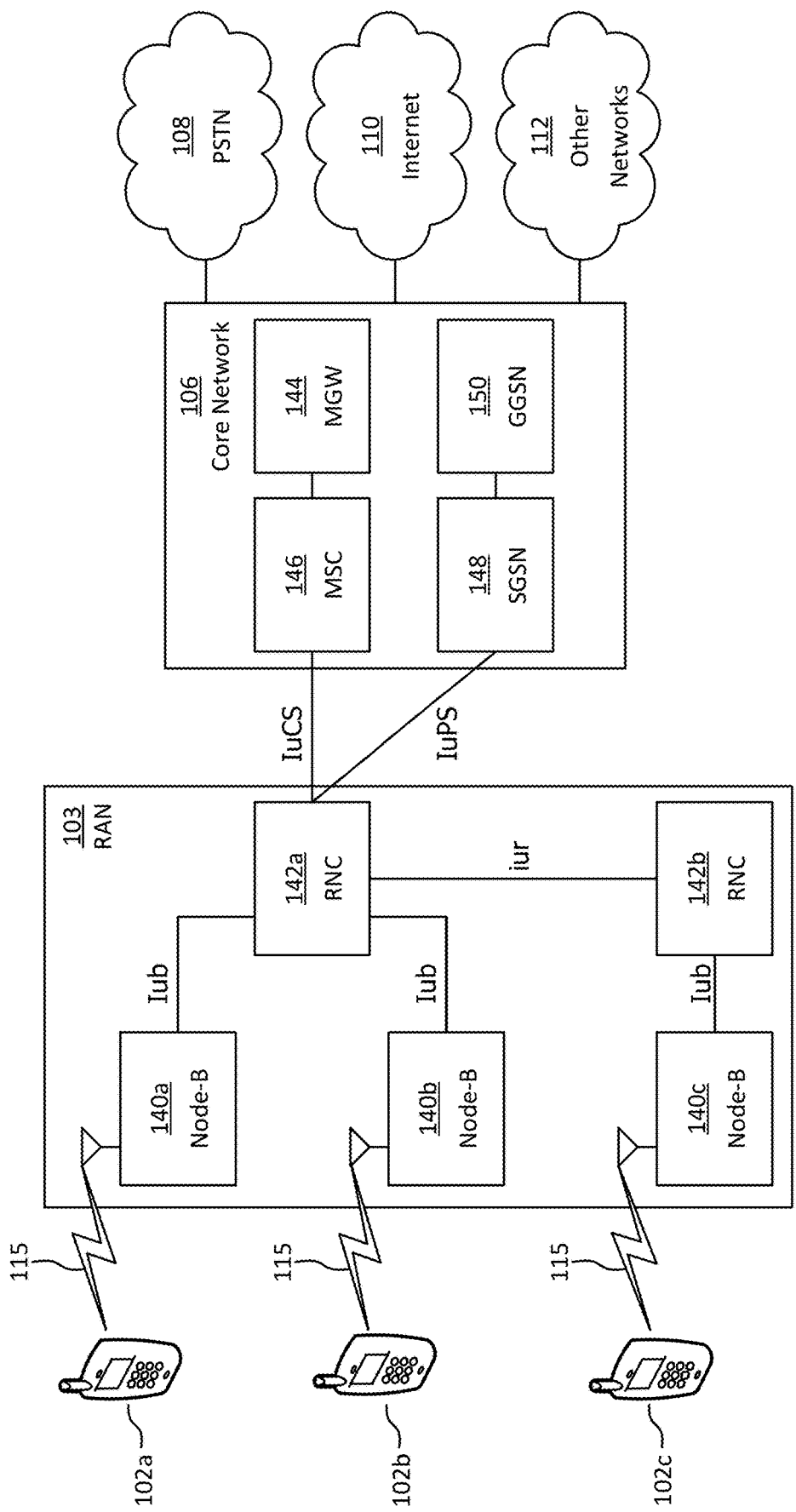
FIG. 1B is a block diagram of an example apparatus or device configured for wireless communications.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
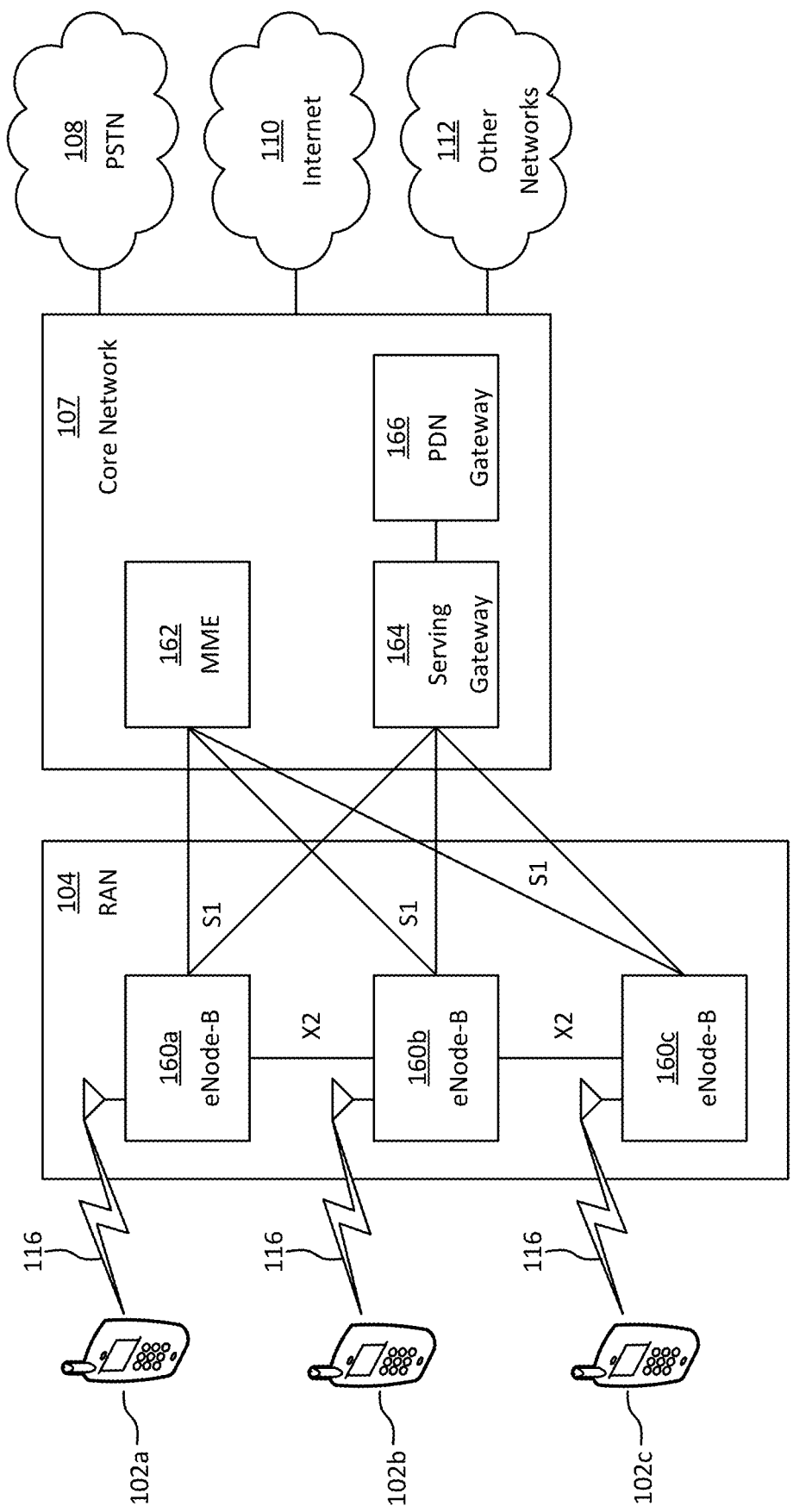
FIG. 1C is a system diagram of an example radio access network (RAN) and core network.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iub interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
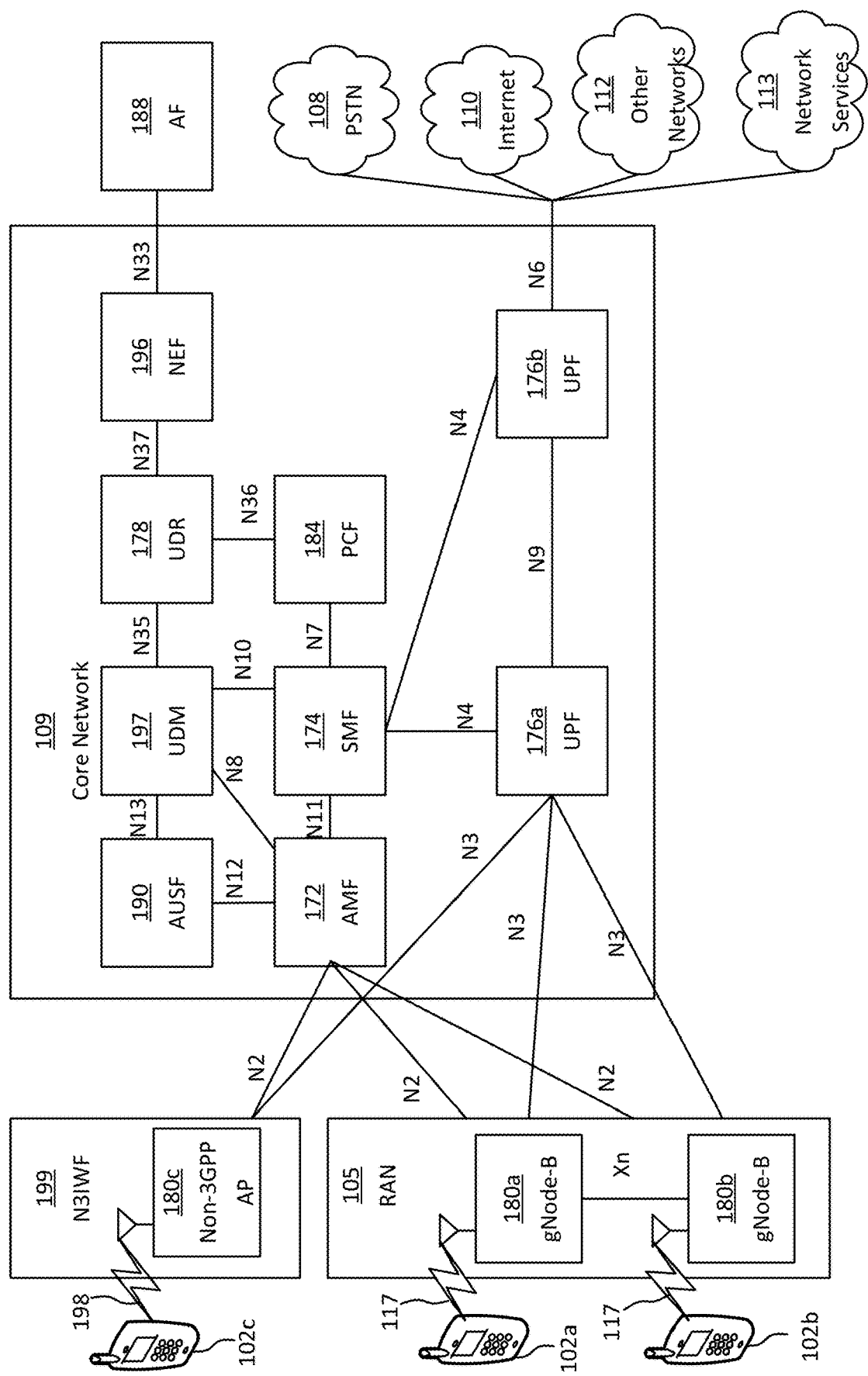
FIG. 1D is a system diagram of another example RAN and core network.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
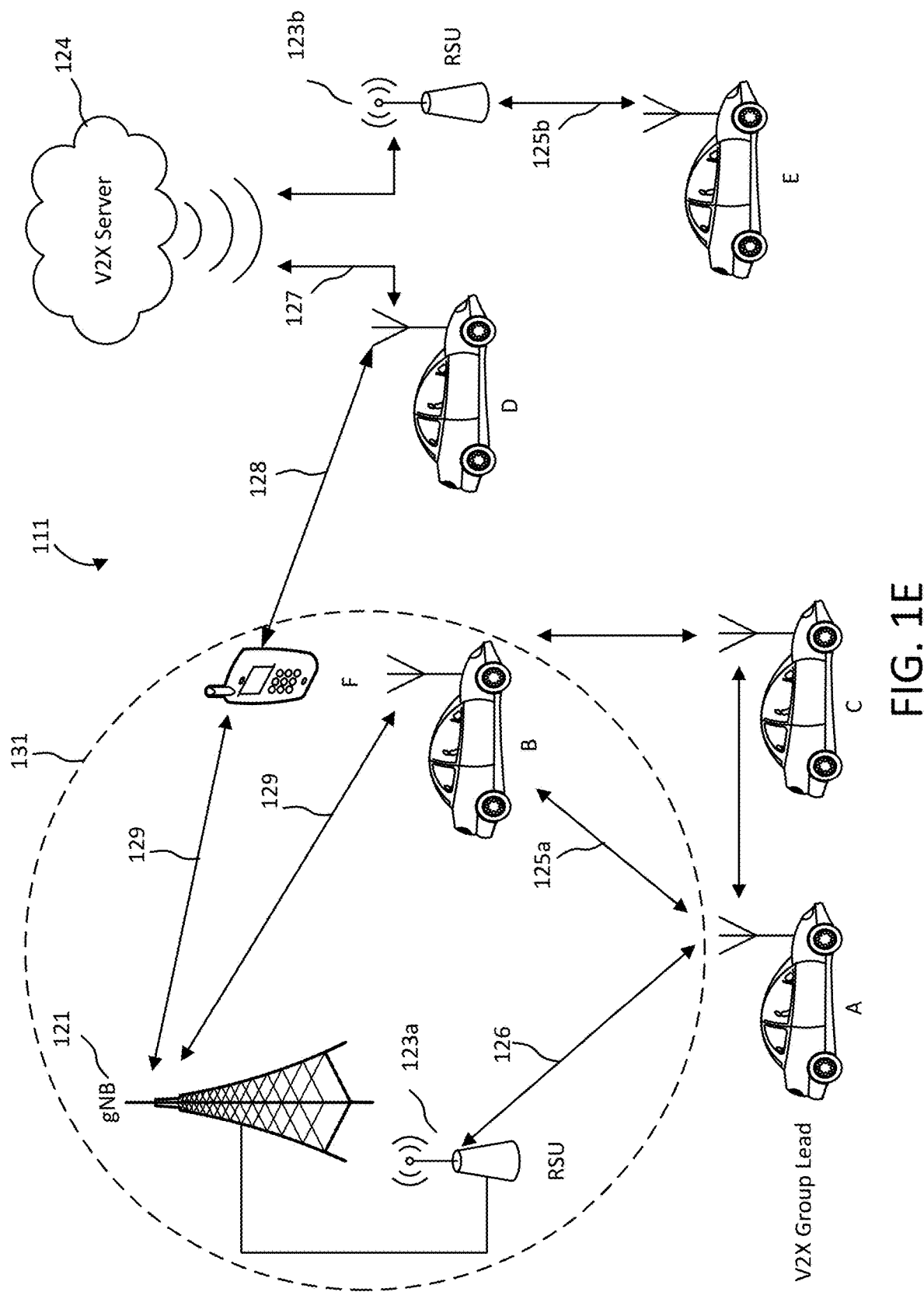
FIG. 1E is a system diagram of another example RAN and core network.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and IE are provided by way of example only, and it is understood that the subject matter disclosed and claimed herein may be embodied or implemented in any similar communication system, whether presently defined or defined in the future.

Figure 1F:
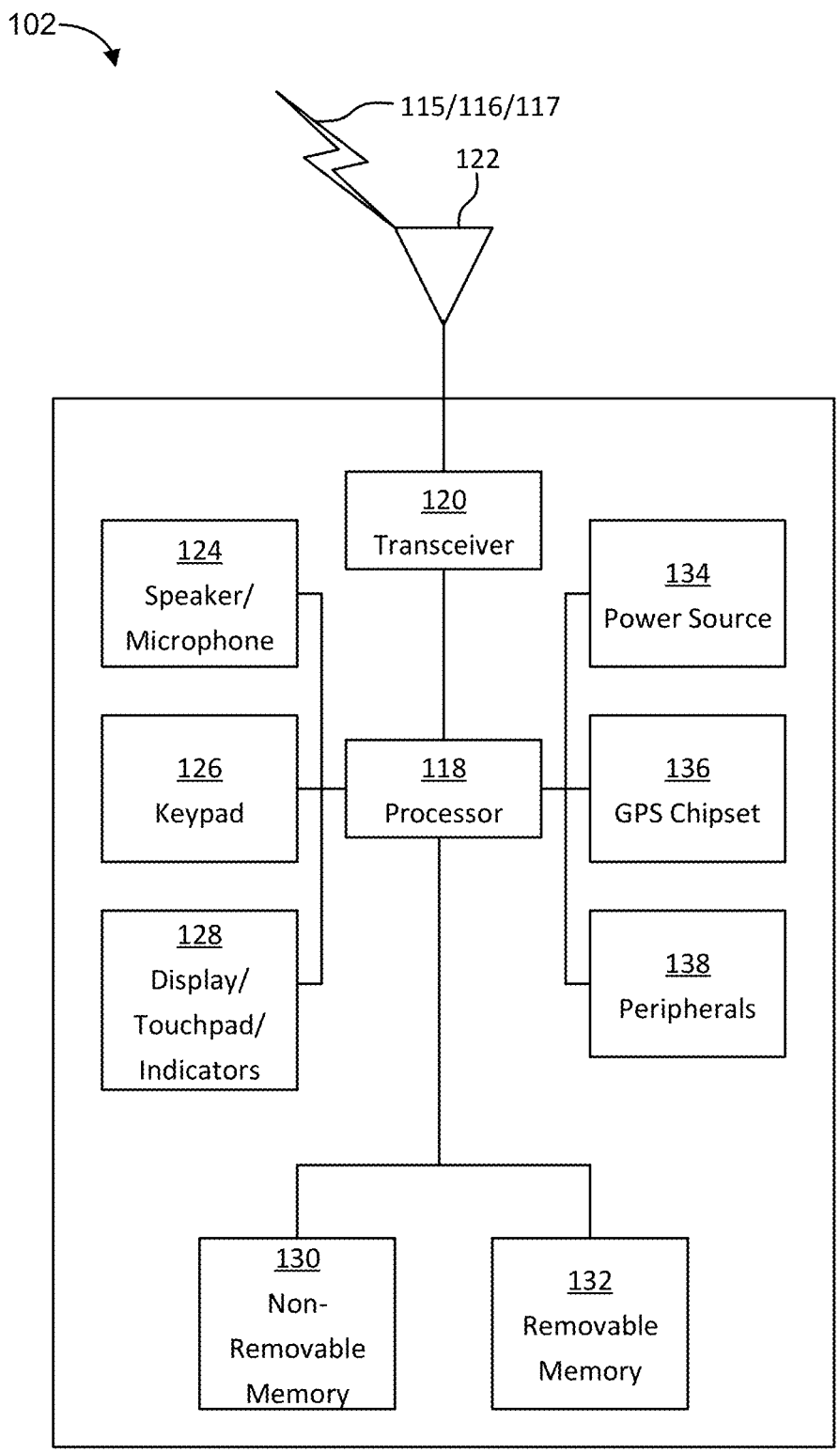
FIG. 1F is a block diagram of an example computing system.

FIG. 1F is a block diagram of an exemplary computing system 90 in which one or more apparatuses of the communications networks illustrated in FIGS. 1A, IC, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
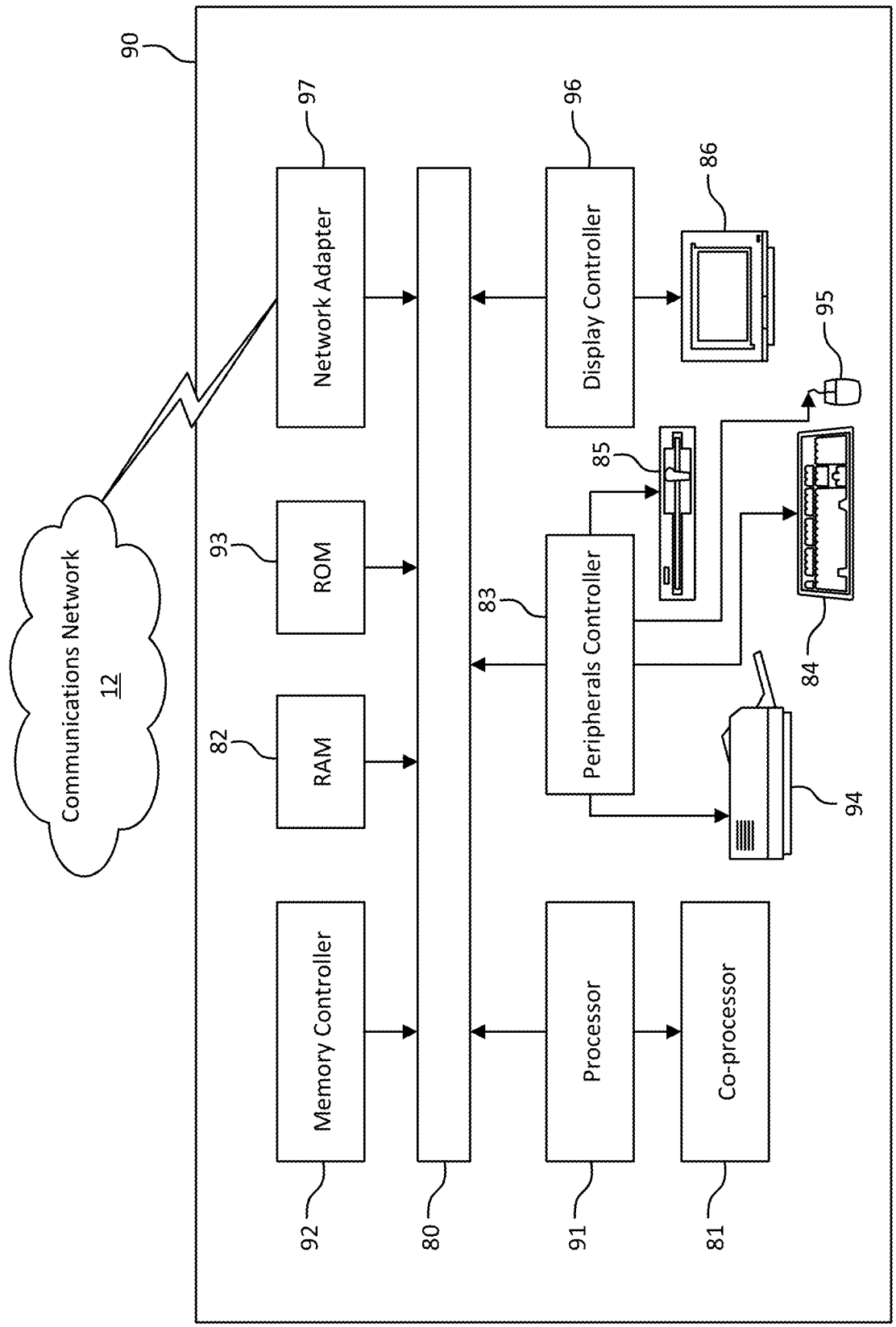
FIG. 1G is a block diagram of another example communications system.

FIG. 1G illustrates one embodiment of an example communications system 111 in which the methods and apparatuses described and claimed herein may be embodied. As shown, the example communications system 111 may include wireless transmit/receive units (WTRUS) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Figure 2:
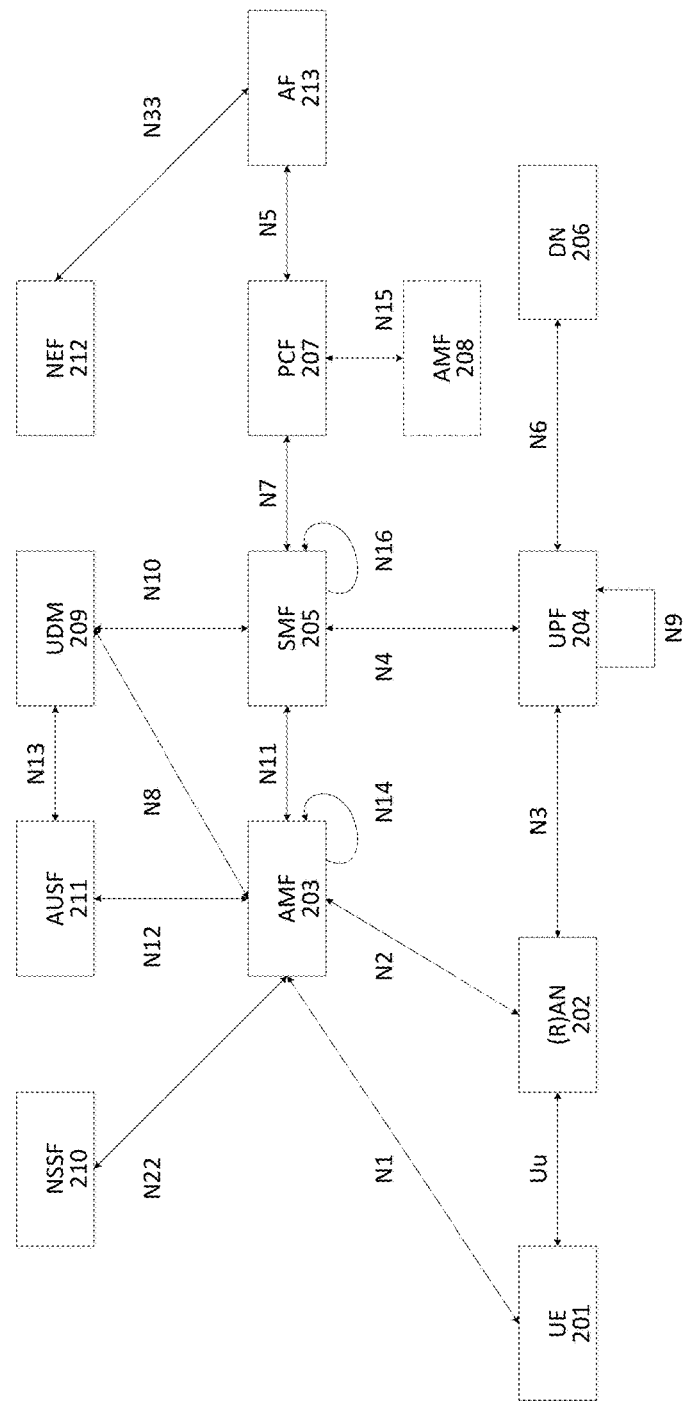
FIG. 2 illustrates a non-roaming 5G system architecture.

FIG. 2 shows an example 5G System (5GS) architecture 200. The example of FIG. 2 comprises a set of Network Functions (NFs) and some network entities. Especially, the 5G Core (5GC) network utilizes service-based principles, where each NF could be a service provider or a service consumer. As a service provider, a NFx includes of a set of services (or functionalities) and provides a Service-Based Interface (SBI), through which other NFs as service consumers can access those services.

As shown in the example of FIG. 2, UE 201 has access, via radio access network ((R)AN) 202, to the access and mobility management function (AMF) 203 over the N1 interface. (R)AN 202 has access to AMF 203 via the N2 interface. (R)AN 202 has access to the user plane function (UPF) 204 via the N3 interface. UPF 204 has access to the session management function (SMF) 205 via the N4 interface. UPF 204 has access to data network (DN) 206 via the N6 interface. The policy control function (PCF) 207 has access to AMF 208 via the N15 interface. AMF 203 has access to SMF 205 via the N11 interface. SMF 205 has access to the unified data management (UDM) 209 via the N10 interface. AMF 203 may access Network Slice Selection Function (NSSF) 210 via the N22 interface. AMF 203 may access Authentication Server Function (AUSF) 211 via the N12 interface. AMF 203 may access UDM 209 via the N8 interface. The UDM 209 may connect to the AUSF 211 via an N13 interface. The network exposure function (NEF) 212 exposes capabilities and services in the 5G core network to Application Functions (AF) 213 via the N33 interface.

Figure 3:
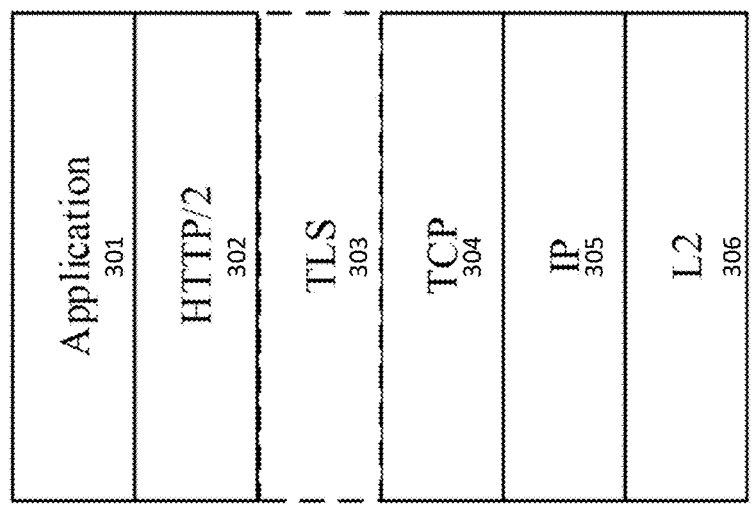
FIG. 3 illustrates a service-based interface (SBI) protocol stack.

FIG. 3 shows an example SBI protocol stack 300. In the example of FIG. 3, where HTTP/2 protocol 302 with JavaScript Object Notation (JSON) is used as the application layer serialization protocol. For the security protection at the transport layer, all 3GPP NFs support Transport Layer Security (TLS) 303, and TLS 303 may be used within a Public Land Mobile Network (PLMN) if network security is not provided by other means. The example of FIG. 3 also shows the application layer 301, Transmission Control Protocol (TCP) layer 304, internet protocol (IP) layer 305, and L2 layer 306.

In order to use services provided by a NF service provider, a NF service consumer first needs to discover the NF service provider and its services. In order to be discovered by a NF service consumer, a NF service provider first needs to register itself to a repository. For example, a Network Data Analytics Function (NWDAF) provides Nnwdaf interface with two services: Nnwdaf_AnalyticsSubscription and Nnwdaf_AnalyticsInfo. Nnwdaf_AnalyticsSubscription enables NF service consumers to subscribe/unsubscribe for different types of analytics from NWDAF.

Network Repository Function (NRF) is a NF, which has services as listed in Table 1 below and provides the following functionalities through them:

Supports a service discovery function;

May receive NF discovery requests from NF instances or Service Communication Proxy (SCP) and provides the information of the discovered NF instances (to be discovered) to the NF instance or SCP;

Maintains the NF profile of available NF instances and their supported services; and Notifies about newly registered/updated/deregistered NF instances along with its NF services to the subscribed NF service consumer or SCP.

TABLE 1

NF Services Provided by NRF

| Service Name | Description | Consumer(s) |
|---|---|---|
| Nnrf_NFManagement | Provides support for register, deregister and update service to NF, NF services. Provide consumers and SCP with notifications of newly registered/updated/deregistered NF along with its NF services. | All NFs and SCP |
| Nnrf_NFDiscovery | Enables one NF service consumer or SCP to discover a set of NF instances with specific NF service or a target NF type. Also enables one NF service or SCP to discover a specific NF service. | All NFs and SCP |
| Nnrf_AccessToken | Provides OAuth2 2.0 Access Tokens for NF to NF authorization as defined in TS 33.501. | All NFs |

Policy Control Function (PCF) as a NF provides several services as listed in Table 2 below to support the following functionality:

Supports unified policy framework to govern network behavior.

Provides policy rules to Control Plane function(s) to enforce them.

Accesses subscription information relevant for policy decisions in a Unified Data Repository (UDR).

TABLE 2

NF Services Provided by PCF

| Service Name | Description | Consumer(s) |
|---|---|---|
| Npcf_AMPolicyControl | This PCF service provides Access Control, network selection and Mobility Management related policies, UE Route Selection Policies to the NF consumers. | AMF |
| Npcf_SMPolicyControl | This PCF service provides session related policies to the NF consumers. | SMF |
| Npcf_PolicyAuthorization | This PCF service authorises an AF request and may generate policies as requested by the authorised AF for the PDU Session to which the AF session is bound to. This service allows the NF consumer to subscribe/unsubscribe to the notification of Access Type and RAT type, PLMN identifier, access network information, usage report etc. | AF, NEF |
| Npcf_BDTPolicyControl | This PCF service provides background data transfer policy negotiation and optionally notification for the renegotiation to the NF consumers. | NEF |
| Npcf_UEPolicyControl | This PCF service provides the management of UE Policy Association to the NF consumers. | AMF, V-PCF |
| Npcf_EventExposure | This PCF service provides the support for event exposure. | NEF |

Network Data Analytics Function (NWDAF) is a network entity which provides the following functionalities:

Data collection based on event subscription, provided by AMF, SMF, PCF, UDM, AF (directly or via NEF), and OAM;

Retrieval of information from data repositories (e.g. UDR via UDM for subscriber-related information);

Retrieval of information about NFs (e.g. NRF for NF-related information, and NSSF for slice-related information); and On demand provision of analytics to consumers based on "Request-Response" and/or "Subscribe-Notify" mechanisms.

Unified Data Repository (UDR) as a NF supports the following functionalities:

Storage and retrieval of subscription data by the Unified Data Management (UDM);

Storage and retrieval of policy data by the PCF;

Storage and retrieval of structured data for exposure;

Application data (including Packet Flow Descriptions (PFDs) for application detection, AF request information for multiple UEs, 5GLAN group information for 5GLAN management); and Storage and retrieval of NF Group ID corresponding to subscriber identifier (e.g. IMPI, IMPU).

The UDR is located in the same PLMN as the NF service consumers storing in and retrieving data from it using Nudr. Nudr is an intra-PLMN interface.

Service Communication Proxy (SCP) is a network entity which provides the following functionalities as specified in 3GPP TS 23.288:

Indirect communication between two NFS;
Delegated discovery for assisting a NF to discover other NFs and their services from NRF;
Message forwarding and routing to destination NF/NF service;
Communication security (e.g. authorization of the NF Service Consumer to access the NF Service Producer API), load balancing, monitoring, overload control, etc.; and
Optionally interact with other entity, e.g. UDR, to resolve the UDM Group ID/UDR Group ID/AUSF Group ID/PCF Group ID based on UE identity, e.g. SUPI.

TS 23.501 also defines some edge computing enablers such as:
User plane (re)selection: the 5G Core Network (re)selects UPF to route the user traffic to the local Data Network;
Session and service continuity to enable UE and application mobility;
An Application Function may influence UPF (re)selection and traffic routing via PCF or NEF;
QoS and Charging: PCF provides rules for QoS Control and Charging for the traffic routed to the local Data Network; and
Support of Local Area Data Network (LADN): 5G Core Network provides support to connect to the LADN in a certain area where the applications are deployed.

In addition, TR 23.748 is studying and evaluating of potential architecture enhancements to support Edge Computing (EC) in 5GC. For example, it may study the following enhancements:
Discovery of IP address of application server deployed in EC environment;
5GC enhancements to support for seamless change of application server serving the UE;
How to efficiently (with a low delay) provide local application servers with information on e.g. the QoS condition of the data path;
Supporting for traffic steering in N6-LAN deployed in Edge Computing environment, including support for end-user traffic sent to the central N6 interface to the data network after having been processed by local application server(s);
Supporting PDU session anchor change when the application server does not support notifications of UE IP address change; and
Supporting I-SMF insertion or reselection based on AF request to route the traffic to application server deployed in Edge Computing environment.

3GPP TR 28.803 specifies use cases, requirements, and solutions for 3GPP management system to support the deployment of edge computing. Some identified requirements include:
Network Function Virtualization Orchestrator (NFVO) should have a capability allowing 3GPP management system to instantiate the VNF(s) with conditions (e.g. location constraints);
The 3GPP management system should have a capability to configure the SMF or NRF (e.g. to add or remove the UPF); and
The 3GPP management system should have a capability to collect the performance measurements (e.g. latency, data volume) for connections from UE to 3GPP UPF.

Figure 4:
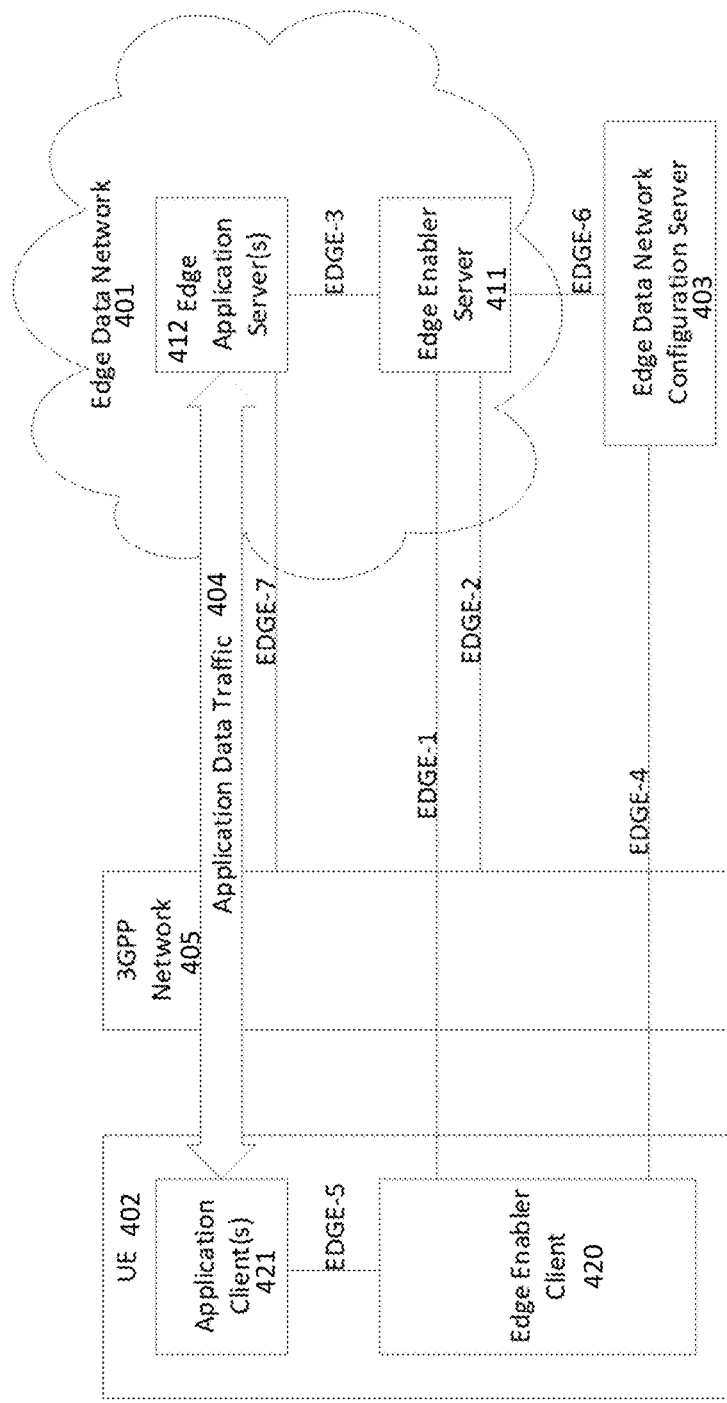
FIG. 4 illustrates an application architecture for enabling edge applications.

FIG. 4 shows an example application architecture for enabling edge applications in 3GPP networks 400. The example of FIG. 4 shows that the edge data network (EDN) 401 comprises a functional entity referred to herein as an edge enabler server (EES) 411. The EES 411 may provide supporting functions needed for edge application servers 412 to run in EDN 401. For example, EES 411 may provide information related to the Edge Application Servers 412, such as availability, to the edge enabler client (EEC) 420.

The EEC 420 may provide supporting functions needed for application client(s) 421. For example, it can discover edge application servers 412 available in the EDN 401. The EEC 420 may also retrieve and provision configuration information to enable the exchange of application data traffic 404 (e.g., via a 3GPP Network 405) with the edge application server 412.

The edge data network configuration server 403 may provide supporting functions needed for the UE 402 to connect with the EES 411.

As shown in FIG. 4, many edge applications could be deployed in edge data networks and leverage edge enabler servers deployed in edge data networks. In addition, once edge applications are deployed in edge data networks, they should be discoverable and provide more efficient services to UEs and other edge applications. Also, edge applications could interact with cloud applications. In addition, due to the emergence of edge data networks, it is expected that UEs may be benefited by directly accessing more nearby edge applications instead of remote cloud applications. As such, to connect, UE context becomes more critical since it may impact how applications and services in edge data networks may be efficiently managed and leveraged.

Figure 5:
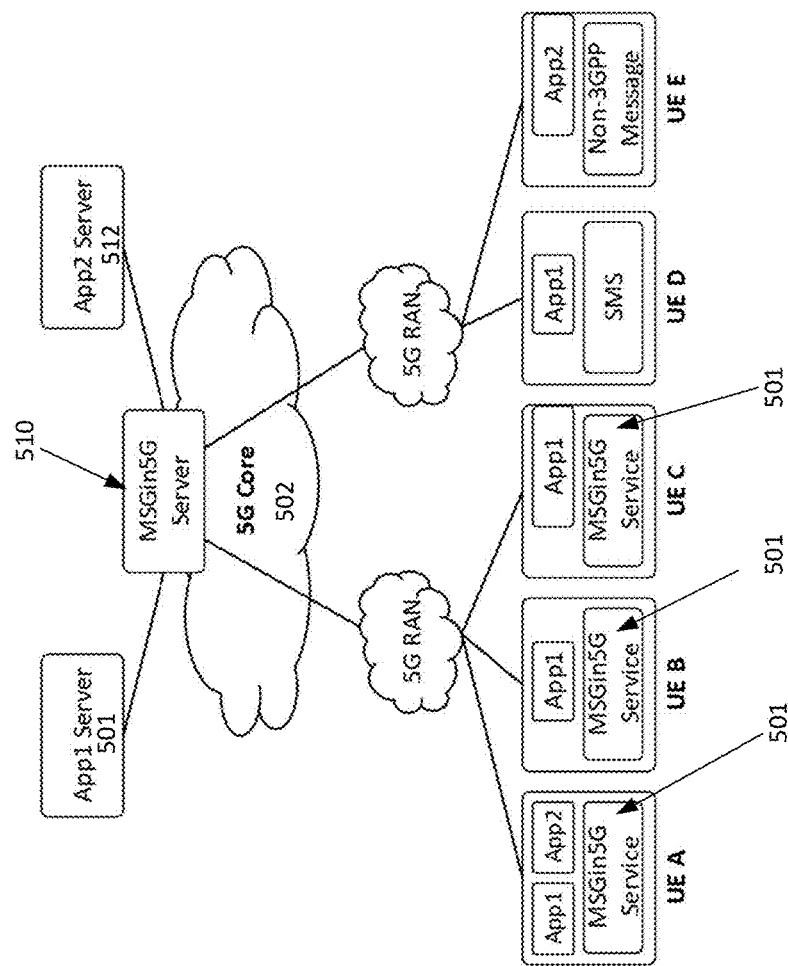
FIG. 5 illustrates a message service over a 5G system.

FIG. 5 shows the use case for a Message Service over 5G Systems (MSGin5G) 500, which is described in TS 22.262 and TR 23.700-24. The MSGin5G 500 supports point-to-point message (e.g. from UE A to UE B), application-to-point message (e.g. from App1 Server 511 to UE B), group message (e.g. from App1 Server 511 to UE B and UE C), and broadcast message (e.g. from App2 Server 512 to all UEs in a location). MSGin5G as a service 501 could reside in 5GC 502. Please note that even from point-to-point message between two UEs under the same 5G RAN (e.g. UE A and UE B), the message needs to first be transmitted from the source UE (e.g. UE A) to MSGin5G Server 510, which may further forward the message to the destination UE (e.g. UE B).

Figure 6:
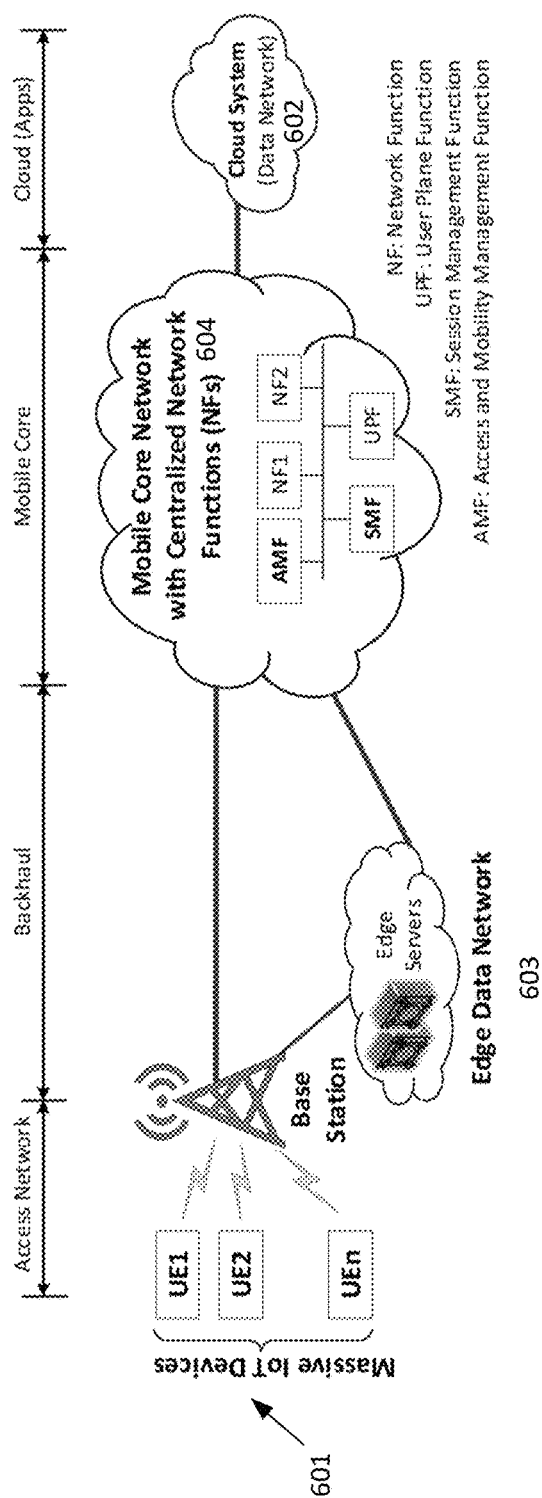
FIG. 6 illustrates concurrent attachment from massive IoT devices.

FIG. 6 shows another example use case. In the example of FIG. 6, massive Internet of Things (IOT) devices 601 connect to 5GS for reporting sensory data to an IoT application. This example may be deployed in the cloud system 602 and/or in edge data networks 603. These IoT devices may attempt to attach to 5GS concurrently, which may cause suddenly high overhead to backhaul links and network functions 604 such as the AMF and the SMF, although these IoT devices are deployed in different locations and may only need to communicate with edge applications in different edge data networks 603. This use case shows that centralized network functions 604 in mobile core networks could get overloaded and cannot function normally in the worst case due to the concurrent attachment from massive IoT devices.

The previous three use cases highlight the following four issues:
5GS lacks a function to collect, store and manage edge data network information;
5GS including edge data networks lacks a function to collect, store and manage UE context information and triggers generated by a UE;
MSGin5G service lacks a mechanism to leverage edge data networks; and
5GS lacks a mechanism to determine and distribute designated NF instances and services to edge data networks although it's been mentioned that functions like UPF could be deployed at the edge.

The embodiments described herein address the issues identified above.

In one embodiment, a mechanism to support edge-assisted UE context and trigger collection is described, where a UE can actively send its context information and/or any trigger (e.g. a request for a network function/service to be deployed in edge data networks, etc.) to an edge enabler server, which may process the received context and triggers from all its UEs. The edge enabler server can also forward UE context and triggers to 5GC upon receiving a solicitation request from 5GC or if 5GC has already made a subscription for getting notification on UE context and triggers.

For example, a UE may perform operations comprising the following:

The UE may receive a first context/trigger subscription from a first network entity;

The UE may generate a first context/trigger based on user inputs and/or configured context/trigger generation policy;

The UE may send the first context/trigger to the second network entity; and

The UE may receive a first response from the third network entity.

A first network entity may be a network function in 5GC, an edge enabler server, or an edge enable client. The second network entity may comprise an edge enabler client. The second network entity after receiving the first context/trigger may generate the second context/trigger based on the first context/trigger. The second network entity may send the second context/trigger to an edge enabler server, where context/triggers received from multiple edge enabler clients may be combined; the edge enabler server may generate an aggregated context/trigger and send it to a network function in 5GC.

In another example, an edge enabler server may perform operations comprising the following The edge enabler server may receive a first context/trigger from a first network entity;

The edge enabler server may receive a second context/trigger from a second network entity;

The edge enabler server may generate an aggregated context/trigger based on the first context/trigger and the second context/trigger;

The edge enabler server may send the aggregated context/trigger to a third network entity;

The edge enabler server may receive a first response from the third network entity;

The edge enabler server may generate a second response based on the first response and may send the second response to the first network entity;

The edge enabler server may generate a third response based on the first response and may send the third response to the second network entity;

The edge enabler server may determine a first set of new network functions and services based on the first context/trigger and/or the second context/trigger;

The edge enabler server may request the first set of new network functions and services from the fourth network entity; and The edge enabler server may receive a fourth response from the fourth network entity.

The first network entity may comprise an edge enabler client. The second network entity may comprise an edge enabler client. The third network entity may comprise a network function in 5GC. The fourth network entity may comprise a network function in 5GC.

In a second embodiment, an edge-assisted message service over 5G systems is described herein to enable MSGin5G to leverage edge data network to improve the message delivery efficiency, especially for point-to-point messages.

For example, a UE may perform the following operations:

The UE may send a first registration request to a first network entity indicating message service requirements and preferences; and The UE may receive a first response from the first network entity.

The first response may include the address of one or more MSGin5G Servers. Each MSGin5G Server may be deployed at an edge data network or in the cloud.

In another example, a UE may perform the following operations:

The UE may send a first discovery request to a first network entity to discover a MSGin5G server;

The UE may receive a first response from a first network entity;

The UE may send a first message service request to a second network entity;

The UE may receive a second response from the second network entity;

The UE may send a first message to the second network entity; and

The UE may receive a third response from the second network entity.

The first discovery request may indicate the target UE identifier. The first network entity may be an edge enabler client, or an edge enabler server. The first response may include a plurality of identifiers of discovered MSGin5G servers. The first message service request may indicate a source UE identifier and a plurality of target UE identifier. The second response may comprise a list of approved target UE identifiers. The first message may comprise a list of target UE identifiers and message delivery priority for each target UE.

In another example, a MSGin5G Edge Server located in a first edge data network may perform the following operations:

The MSGin5G Edge Server may register itself with an NRF or a MSGin5G Server in 5GC;

The MSGin5G Edge Server may discover other MSGin5G Edge Servers from NRF or MSGin5G Server;

The MSGin5G Edge Server may establish a sub-group of multiple UEs;

The MSGin5G Edge Server may send the established sub-group to MSGin5G Server;

The MSGin5G Edge Server may send periodical status report to MSGin5G Server indicating message forwarding statistics at the MSGin5G Edge Server;

The MSGin5G Edge Server may receive a first message from MSGin5G Server, another MSGin5G Edge Server, an application, or a UE;

The MSGin5G Edge Server may determine the receivers of the first message;

The MSGin5G Edge Server may forward the message to receivers via different paths, and:

if a receiver is an application in cloud, forwards the first message to MSGin5G Server;

if a receiver is close to another nearby MSGin5G Edge Server, forward the first message to another MSGin5G Edge Server;

if a receiver is an application deployed in the first edge data network, forward the first message directly to the receiver (or via a local UPF/SEF);

if a receiver is a UE leveraging the first edge data network, forward the first message to the receiver via a local UPF/SEF deployed in the first edge data network; and otherwise, forward the first message to MSGin5G Server.

In a third embodiment, an Edge Network Repository Function (ENRF) as a an NF is described that may collect, store, and manage edge data network information. NF consumers can discover edge data networks and edge servers from ENRF.

For example, an ENRF may perform the following operations:

The ENRF may receive an edge network and server (de-)registration request from a first network entity;

The ENRF may send an edge network and server (de-)registration response to the first network entity;

The ENRF may receive an edge network and server discovery request from a second network entity; and The ENRF may send an edge network and server discovery response to the second network entity.

The ENRF may maintain a list of registered edge data networks and a list of registered edge servers deployed in different locations. The edge network and server registration request may comprise: the location of one or more edge data networks, the name of one or more edge data networks, the identifier of one or more edge servers deployed in one or more edge data networks, the list of (un-)allowed UEs for an edge data network and/or an edge server, the list of UEs who are using an edge servers, etc. The first network entity may be an edge enabler server, an edge network controller, an edge network gateway, an ETSI MEC orchestrator, a mobile cellular network OAM system, etc. The edge data network and server registration response may comprise: the assigned name for an edge data network or an edge server, a list of (un-)allowed edge applications for an edge data network, a list of (un-)allowed UEs for an edge data network and/or an edge server, etc. The edge network and server discovery request may comprise: a discovery filter to discover edge data networks in a given location, a discovery filter to discover edge data networks which a given edge application is located, a discovery filter to discover edge servers in a given location, a discovery filter to discover edge servers which a given edge application is located, a discovery filter to discover UEs which are using one or more edge data networks, a discovery filter to discover UEs which are using one or more edge servers, etc. The second network entity may be a network function consumer (e.g. an AMF, an SMF, etc.), a network function distribution manager, an edge network controller, an edge server, an ETSI MEC orchestrator, a mobile cellular network OAM system, etc.

In a fourth embodiment, an edge-assisted distributed network function solution is described herein to distribute network functions from 5GC to edge data networks to facilitate UEs and edge applications with higher efficiency such as reduced latency for accessing network functions. For example, the following procedures may be performed:

Configuring policies for network functions distribution;
Generating triggers for network function distribution;
Distributing selected network functions from core networks to selected edge data networks;
Leveraging network functions deployed at edge data networks; and
Coordinating network functions at edge data networks and the ones at core networks.

In another example, a UE may perform the following operations:

The UE may receive a network function distribution policy configuration request from a first network entity which may comprise one or more network function distribution policies;

The UE may verify the network function distribution policies;

The UE may store the network function distribution policies;

The UE may generate a network function distribution policy configuration response;

The UE may send the network function distribution policy configuration response to the first network entity;

The UE may generate a network function distribution trigger for distributing a first network function at core network to a first edge node;

The UE may send a network function distribution trigger request to a third network entity;

The UE may receive the network function distribution trigger response from the third network entity;

The UE may receive a network function distribution notification request from a fourth network entity indicating the address of a second network function being successfully deployed at the first edge node as the peer network function of the first network function;

The UE may send a network function access request to the second network function to access it;

The UE may receive a network function access response from the second network function;

The UE may receive a network function adjustment notification request from the fifth network entity to switch from using the second network function at the first edge node to the first network function at the core network or another network function at another edge node;

The UE may send a network function adjustment notification response to the fifth network entity; and The UE may send a network function access request to the first network function at the core network or to another network function at another edge node.

The first network entity may comprise a policy control function, a network function distribution manager, an edge server, etc. A network function distribution policy may specify the conditions for triggering to distribute one or more network functions from core network to one or more edge servers in one or more edge data networks. The network function distribution trigger request may indicate the identifier of the first network function, the location of the first edge node for the first network function to be distributed to, the context info about the first edge node such as the identifier of an edge server and/or the identifier of an edge data network, a trigger reason, the time for distributing the first network function to the first edge node, the priority for distributing the first network function to the first edge node, the mode for coordination between the first network function at core network and its peer network function to be created at the first edge node, etc. The third network entity can be a network function distribution manager, the first network function, an edge server, etc. The network function distribution notification request may include the identifier of the second network function, the identifier of user plane function for accessing the second network function, a lifetime for the second network function, the identifier of the edge server where the second network function resides, a group of user equipment that have privileges to access the second network function, a group of edge applications that have privileges to access the second network function etc. The fourth network entity can be a network function distribution manager, the first network function, an edge server at the first edge node, etc. The network function access request may indicate a need for switching back to the first network function after a time duration. The network function access response may include a trigger for switching back to the first network function. The network function adjustment notification request may include the identifier of the first network function, the mode for synchronizing content and context information between the second network function and the first network function, etc. The fifth network entity may be a network function distribution manager.

In another example, a UE may perform the following operations:
- The UE may receive network function distribution policies from a PCF;
- The UE may send the network function distribution policy configuration response to the PCF;
- The UE may generate a network function distribution trigger for distributing a first network function at core network to a first edge node;
- The UE may send a network function distribution trigger request to a Network Function Distribution Manager;
- The UE may receive the network function distribution trigger response from the Network Function Distribution Manager;
- The UE may receive a network function distribution notification from the Network Function Distribution Manager indicating the address of a second network function being successfully deployed at the first edge node as the peer network function of the first network function;
- The UE may send a network function access request to the second network function to access it;
- The UE may receive a network function access response from the second network function;
- The UE may receive a network function adjustment notification request from the Network Function Distribution Manager to switch from using the second network function at the first edge node to the first network function at the core network or another network function at another edge node; and
- The UE may send a network function adjustment notification response to Network Function Distribution Manager.

In another example, an edge server may perform the following operations:
- The edge server may receive a network function distribution policy configuration request from a first network entity which may comprise one or more network function distribution policies;
- The edge server may verify the network function distribution policies; The edge server may store the network function distribution policies;
- The edge server may generate a network function distribution policy configuration response;
- The edge server may send the network function distribution policy configuration response to the first network entity;
- The edge server may send a network function distribution policy discovery request to a first network entity for discovering and retrieving one or more network function distribution policies;
- The edge server may receive a network function distribution policy discovery response from the first network entity, which includes one or more network function distribution policies;
- The edge server may store the network function distribution policies;
- The edge server may send a network function distribution trigger request to a third network entity including a first trigger for distributing a first network function to a first edge node;
- The edge server may receive a network function distribution trigger response from the third network entity;
- The edge server may receive a network function distribution request from a fourth network entity for distributing the first network function to the edge server, i.e., to create and activate a second network function at the edge server, referred to as the peer network function of the first network function;
- The edge server may generate and activates the second network function;
- The edge server may send a network function distribution response to the fourth network entity;
- The edge server may send a network function distribution notification to a fifth network entity;
- The edge server may receive a network function access request from a sixth network entity for accessing the second network function;
- The edge server may execute the network function access request and generates a network function access response;
- The edge server may send the network function access response to the sixth network entity;
- The edge server may send a network function status report request to the seventh network entity to report the current status of the second network function;
- The edge server may receive a network function status response from the seventh network entity;
- The edge server may receive a network function adjustment request to adjust the second network function;
- The edge server may send a network function adjustment response to an eighth network entity; and
- The edge server may send a network function adjustment notification to a ninth network entity. The first network entity can be a policy control function, a network function distribution manager, an unstructured data storage function, a unified data repository function, a unified data management function, etc. A network function distribution policy may specify the conditions for triggering to distribute one or more network functions from core network to one or more edge servers in one or more edge data networks. The network function distribution policy configuration response may include the identifier of the edge server, the location of the edge server, the traffic load at the edge server, the capabilities such as storage and computation at the edge server, the list of current network functions at the edge server, the list of current edge applications that the edge server serves, the list of network functions that the edge server can host, the list of network functions that the edge server cannot host, the time window that the edge server is willing and/or unwilling to host network functions, etc.

The first trigger may be received from a first edge application or generated by the edge server. The first trigger may indicate the identifier of the first network function, the location of the first edge node for the first network function to be distributed to, the context info about the first edge node such as the identifier of an edge server and/or the identifier of an edge date network, a triggering reason, the time for distributing the first network function to the first edge node, the priority for distributing the first network function to the first edge node, the mode for coordination between the first network function at core network and its peer network function to be created at the first edge node, etc.

The third network entity can be a network function distribution manager, the first network function. The network function distribution trigger response may include an identifier of the first edge server at the first edge node, the identifier of the first edge data network at the first edge node, etc. The network function distribution request may include the identifier of the first network function at core network, the software image for the first network function, the identifier of a user plane path, the identifier of the edge enabler server, a set of network function distribution requirements, a set of network function access rules, etc. The set of network function distribution requirements may include the mode for coordination between the first network function at core network and the second network function to be created at the first edge node, the lifetime for the second network function, etc.

The set of network function access rules may include the list of edge applications that can access the second network function to be created at the edge server, a list of edge applications that cannot access the second network function, a list of user equipment that can access the second network function, a list of user equipment that cannot access the second network function. The network function distribution response may include the identifier of the second peer network function, the identifier of the edge server, the identifier of user plane function for accessing the edge server, the capabilities of the edge server, the context information of the edge data network where the edge server resides, etc. The fourth network entity can be a network function distribution manager, the first network function at the core network, etc. The network function distribution notification may include the identifier of the second network function created and hosted by the edge server, the identifier of the user plane function for accessing the second network function.

The fifth network entity can be an edge application, a user equipment, a user plane function, a control plane function, etc. The network function access request may include the identifier of the second network function, a need for switching back to the first network function after a time duration, etc. The network function access response may indicate a trigger for switching back to the first network function after a time duration, etc. The sixth network entity can be an edge application, a user equipment, another edge server, etc. The network function status report request may include a list of network functions hosted by the edge server, the current status of each listed network function, a need for switching a listed network function to its peer network function at the core network after a time duration. The network function status response may indicate a trigger for switching a network function from the edge server to the core network. The seventh network entity can be a network function distribution manager, the first network function at core network, etc. The network function adjustment request could be generated by the edge server itself, issued by a network function manager, or another network function at the core network.

The network function adjustment request may include the identifier of network functions which are currently hosted by the edge server but to be adjusted, adjustment actions, adjustment conditions, the identifier of network functions which are hosted at core network but associated with the network functions to be adjusted, etc. The adjustment actions may be to deactivate, to remove, to relocate, etc. The adjustment conditions may include the time for starting the adjustment, the number of edge applications and/or user equipment that use those to-be-adjusted network functions is less than a threshold, a new location if the adjustment action is "to relocate", etc. The eighth network entity can be a network function distribution manager. The network function adjustment notification request may include the identifier of the edge server, the identifier of the network function being adjusted, the identifier of peer network function of the network function being adjusted, etc. The ninth network entity can be an edge application, a user equipment, and/or an edge data network controller.

In another example, a network function distribution manager may perform the following operations:

The network function distribution manager may send a network function distribution policy configuration request to a first network entity, which may comprise one or more network function distribution policies;

The network function distribution manager may receive a network function distribution policy configuration response from the first network entity;

The network function distribution manager may receive a network function distribution policy discovery request from a first network entity for discovering and retrieving one or more network function distribution policies;

The network function distribution manager may send a network function distribution policy discovery response to the first network entity, which includes one or more network function distribution policies;

The network function distribution manager may receive a network function distribution trigger request from a third network entity for distributing network functions at core network to a first edge node;

The network function distribution manager may send a network function distribution trigger response to the third network entity;

The network function distribution manager may select an appropriate first network function to be distributed to the first edge node, based on context information from other network entities;

The network function distribution manager may select an appropriate first edge server, where the selected first network function may be distributed to;

The network function distribution manager may select an appropriate first user place function for making access to the first edge server;

The network function distribution manager may send a network function distribution request to the selected first edge server;

The network function distribution manager may receive a network function distribution response from the first edge server;

The network function distribution manager may send a network function distribution notification to a fourth network entity;

The network function distribution manager may receive a network function status report request from a fifth network entity;

The network function distribution manager may send a network function adjustment request to the first edge server;

The network function distribution manager may receive a network function adjustment response from the first edge server; and The network function distribution manager may send a network function adjustment notification to a sixth network entity.

The network function distribution manager may reside in an edge data network and/or a core network. A network function distribution policy may specify the conditions for triggering to distribute one or more network functions from core network to one or more edge enabler server in one or more edge data networks. The first network entity can be a user equipment, an edge enabler server, a policy control function, a network repository function, other network functions, etc. The network function distribution trigger request may indicate the identifier of the network function to be distributed, the location of the first edge node for the network function to be distributed to, the context info about the first edge node such as the identifier of an edge server and/or the identifier of an edge data network, a triggering reason, the time for distributing the network function to the first edge node, the priority for distributing the network function to the first edge node, the mode for coordination between the network function at core network and its peer network function to be created at the first edge node, etc. The network function distribution trigger request can be generated locally at the network function distribution manager and thus a network function distribution trigger response may not be sent to the third network entity.

The third network entity can be an edge server, a user equipment, a policy control function, an edge application, other network functions, etc. The first network function may be an AMF, SMF, UPF, NWDAF, MSGin5G Service, etc. Other network entities can be user equipment, edge applications, core applications, network functions, and/or edge servers. The selected first user plane function allows user equipment, edge applications, and/or other edge servers to directly and more efficiently access the first edge server and thus any network function being distributed onto it. The network function distribution request may include the identifier of the selected first network function at the core network, the software image for the first network function, the identifier of the selected first user plane path, the identifier of the selected first edge server, a set of network function distribution requirements, a set of network function access rules, etc. The set of network function distribution requirements includes the mode for coordination between the first network function at the core network and the peer network function to be created at the first edge node (referred to as the second network function), the lifetime for the second network function, etc. The set of network function access rules includes the list of edge applications that can access the second network function to be created at the first edge server, a list of edge applications that cannot access the second network function, a list of user equipment that can access the second network function, a list of user equipment that cannot access the second network function, etc.

The network function distribution response may include the identifier of the created second network function at the first edge server, the identifier of the first edge server, the identifier of the first user plane function for accessing the first edge server, the edge capabilities of the first edge server, the context information of the edge data network where the first edge server resides, etc. The network function distribution notification may include the identifier of the created second network function hosted by the first edge server, the identifier of the first user plane function for accessing the second network function.

The fourth network entity can be a user equipment, an edge application, the selected second network function, a policy control function, a network repository function, etc. The network function status report request may include the identifier of network functions hosted by an edge server, the current status of these network functions, the current edge capabilities of the edge server, etc. The network function status report request could be one-time request triggered by a previous network function status solicitation request being sent from the network function distribution manager to the fifth network entity, or repeated and periodical requests as a result of a previous subscription the network function distribution manager made to the fifth network entity.

The fifth network entity can be an edge server, a network repository function, other network functions, etc. The network function adjustment request may include the identifier of network functions which are currently hosted by the first edge server but to be adjusted, adjustment actions, adjustment conditions, the identifier of network functions which are hosted at the core network but associated with the network functions to be adjusted, etc. The adjustment actions may be to deactivate, to remove, to relocate, etc. The adjustment conditions may include the time for starting the adjustment, the number of edge applications and/or user equipment that use those to-be-adjusted network functions is less than a threshold, a new location if the adjustment action is "to relocate", etc. The network function adjustment response may be followed by a network function adjustment confirmation, which may be sent from the first edge server to the network function distribution manager only when the specified adjustment action is executed. The sixth network entity can be a user equipment, an edge application, a network repository function, the network function at the core network that is associated with the network function being adjusted, etc.

A network function distribution manager may perform the following operations:

The network function may receive network function distribution policies from a PCF;

The network function may generate a network function distribution trigger for distributing a first network function to an edge data network, based on the policies received from the PCF;

The network function may select an appropriate first edge data network and a first edge sever, based on context information received from the Edge Network Repository Function;

The network function may send a network function distribution request to the selected first edge server;

The network function may receive a network function distribution response from the first edge server indicating a second network function is deployed at the first edge server;

The network function may send configuration information to the second network function;

The network function may send a network function distribution notification to an NRF registering the second network function to the NRF;

The network function may receive periodical reports from the second network function indicating the latest status of the second network function;

The network function may decide to adjust the second network function based on policies received from the PCF and the latest status of the second network function;

The network function may send a network function adjustment request to the second network function;

The network function may receive a network function adjustment response from the second network function; and The network function may send a network function adjustment notification to the NRF. The configuration information may include the address of an NRF, the address of the network function distribution manager, the address of the first network function, the frequency for sending periodical reports to the network function distribution manager, etc. The network function distribution manager may reside in a core network and/or in an edge data network.

The following concepts are described herein with respect to the embodiments described herein.

Edge Network and Server Context (ENSC): Context and characteristics information (e.g. location, capabilities, constrains, etc.) about an edge data network and edge servers deployed in the edge data network.

ENRF: A network function or a logical entity which maintains records for edge network and server context. For example, ENRF may receive an edge data network/server registration from other logical entities, create edge data networks/server context records, receive a query for edge data networks/servers from a NF consumer, and returns matched edge data networks/servers to the NF consumer.

Edge Network Controller (ENC): A logic entity which knows information about one or more edge data networks/servers and registers their context to ENRF. ENC can also discover other edge data networks/servers from ENRF. ENC could be deployed inside an edge data network or it could be a third-party entity (e.g. another ENRF owned by a different operator, an MEC orchestrator, an 5G OAM system, etc.), ENC could be edge data network configuration serve as defined in 3GPP TR 23.758.

Distributed NF (DNF): A NF which is distributed to and deployed in an edge data network.

Centralized NF (CNF): A NF which is deployed in mobile core networks such as 5GC. A CNF may have multiple DNF instances. For example, a centralized NWDAF in 5GC could have multiple distributed NWDAF instances being deployed in edge data networks.

NF Distribution (NFD): A process to distribute one or more NFs to one or more edge data networks. In other word, upon the completion of NFD, one or more DNFs may be created and deployed in one or more edge data networks.

NFD Policies: Policies for describing conditions and rules about whether, when and how NFD may be conducted.

NF Distribution Manager (NFDM): A network function or a logical entity which initiates, monitors, manages, and controls NFD process. For example, NFDM may select an appropriate NF and an appropriate edge data network; then it triggers to create and deploy the selected NF to the selected edge data network. NFDM could be implemented as a part of an existing NF (e.g. NRF) or as a standalone NF. NFDM may be in a client mode (i.e. deployed in edge data networks) or in a server mode (i.e. deployed in 5GC).

Figure 7:
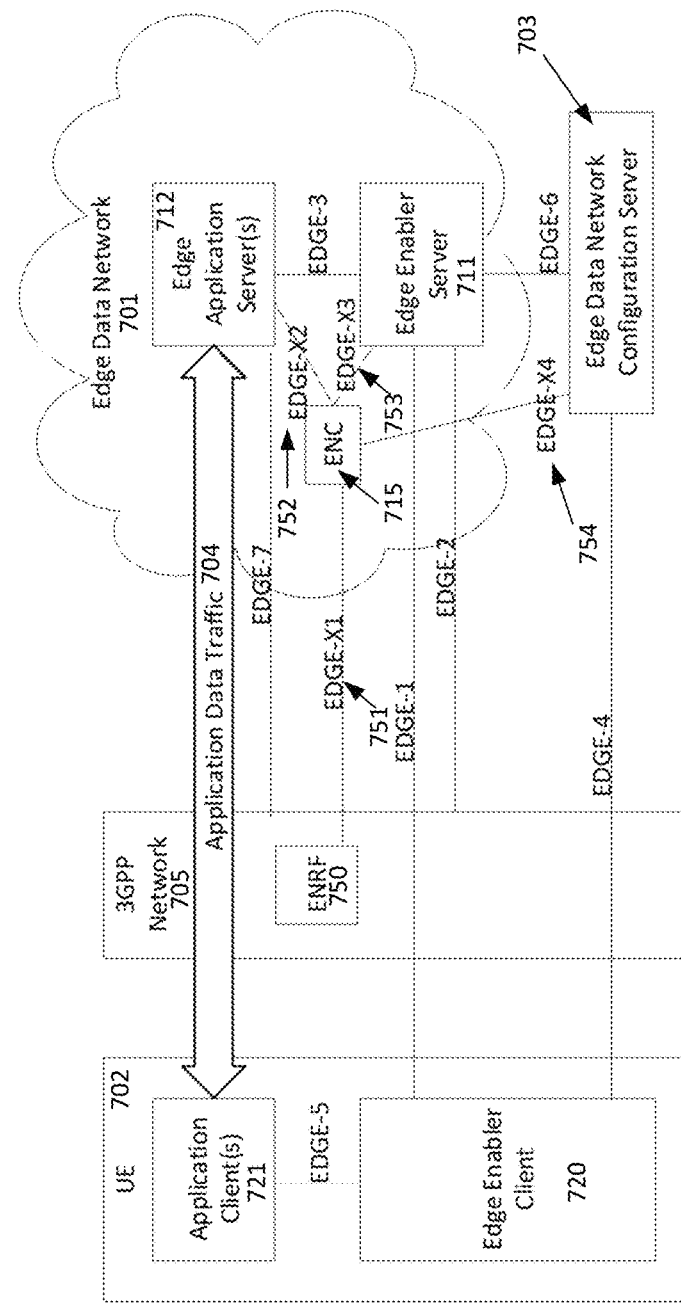
FIG. 7 illustrates the architectural framework for the realization of proposed edge-assisted network function distribution

FIG. 7 shows framework of Edge Application Enablement architecture 700. The example of FIG. 7 shows that the EDN 701 comprising an EES 711. The EES 711 may provide supporting functions needed for edge application servers 712 to run in EDN 701. For example, EES 711 may provide information related to the Edge Application Servers 712, such as availability, to the EEC 720. The EEC 720 may provide supporting functions needed for application client(s) 721. For example, it can discover edge application servers 712 available in the EDN 701. The EEC 720 may also retrieve and provision configuration information to enable the exchange of application data traffic 704 (e.g., via a 3GPP Network 705) with the edge application server 712. The edge data network configuration server 703 may provide supporting functions needed for the UE 702 to connect with the EES 711.

The edge-assisted network function distribution can be implemented in the framework of Edge Application Enablement architecture 700 with the following extensions:

ENRF 750 may comprise a logic function and may be a part of the 3GPP network 705 or an application server function. ENC 715 may comprise a logic function and a part of the edge data network(s) 701. EDGE-X1 751 is an interface between the ENRF 750 and the ENC 715 to support functions such as for the ENC 715 to register edge data network context information with the ENRF 750 or for the ENC 715 to discover edge data network context information from ENRF.

EDGE-X2 752 is an interface between ENC 715 and Edge Application Server(s) 712 to support functions such as for Edge Application Server(s) 712 to register their context information with the ENC 715 or for the ENC 715 to retrieve their context information from Edge Application Server(s) 712.

Edge-X3 753 is an interface between ENC 715 and the EES 711 to support functions such as for EES 711 to register its context information with the ENC 715 or for ENC 715 to retrieve EES 711 context information directly.

EDGE-X4 754 is an interface between the ENC 715 and Edge Data Network Configuration Server 703 to support functions such as for the Edge Data Network Configuration Server 703 to configure the ENC 715 with the access information of the ENRF 750 (e.g. address, name, and/or identifier, etc.)

Figure 8:
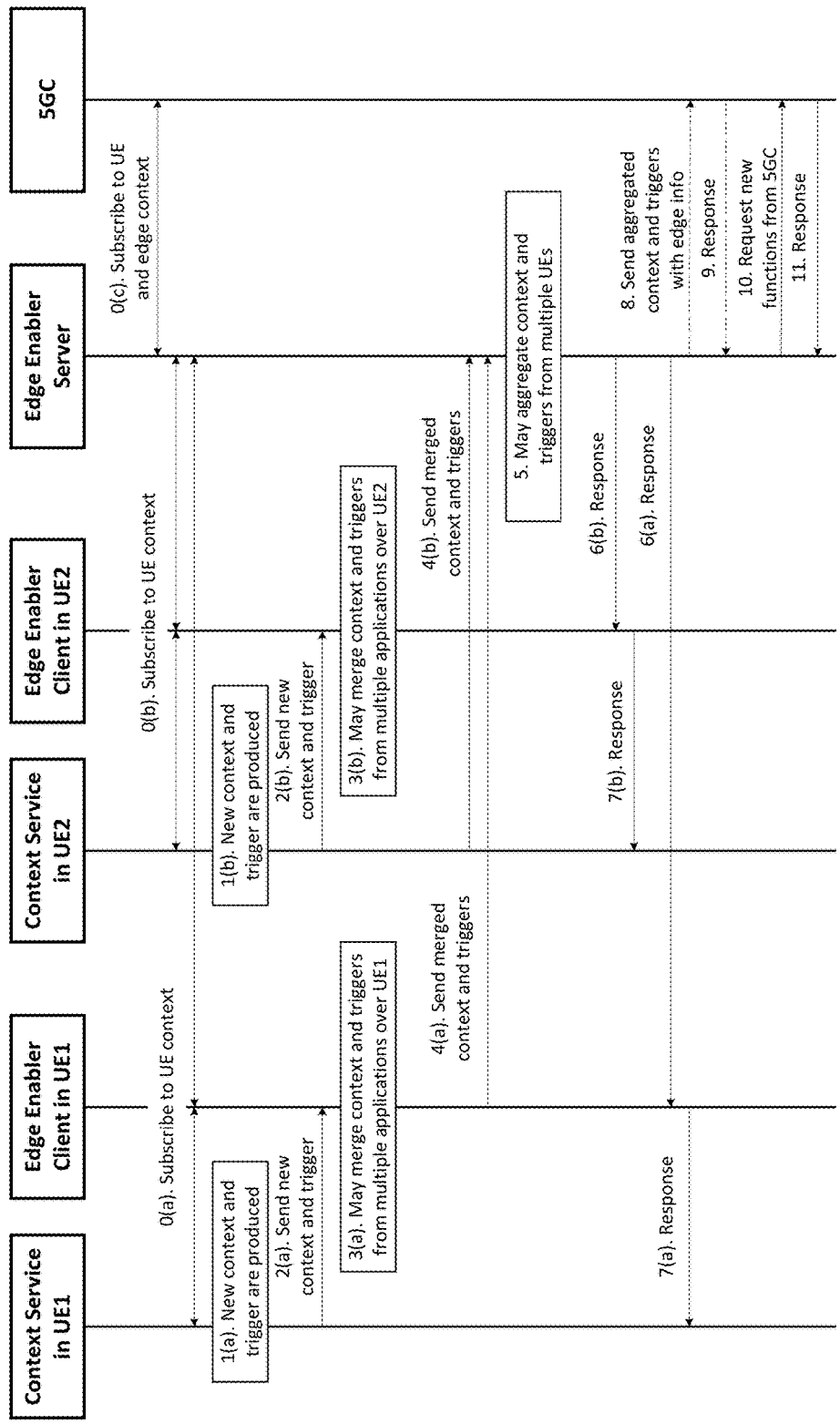
FIG. 8 illustrates edge-assisted UE context and trigger collection.

FIG. 8 shows an example procedure for edge-assisted UE context and trigger collection 800. In step 0(c), a 5GC (e.g. UDM, AF, UDR or a new NF) subscribe to an Edge Enabler Server (EES) in order to receive automatic notifications about UE context and triggers (e.g. via step 8 below). In step 0(b) and 0(a), the EES may subscribe to Edge Enabler Client (EEC) (e.g. EEC in UE1 and/or EEC in UE2) and Context Service (e.g. in UE1 and/or UE2) for UE context and triggers. In step 1, a context service in a UE (e.g. UE1 or UE2) may detect that there is a new context or one or more triggers that are to be sent to EES. The new context or triggers could be from one or more applications on a UE. In step 2, a context service in a UE may send new context and triggers to the EEC in the same UE. In step 3, the new context and triggers may be from different applications and may have some duplication. As such, the EEC may merge the received context and triggers by removing duplication. In step 4, the EEC may send a merged context and triggers to EES. In step 5, the EES may receive the merged context and triggers from multiple EECs, which the EES may aggregate to generate an aggregated context and triggers. The EES may store the received context and triggers. In step 6, the EES may send a response to the EEC. The EEC may send a response to the context service in UE. In step 8, the EES may send the aggregated context and triggers with its edge context information to the 5GC (either an existing 5GC network function such as the UDM, AF, UDR, or a new context service network function in the 5GC). The edge context information may indicate the EES itself only or indicate its supported edge applications and edge enabler clients as well. In step 9, the 5GC may send a response to EES. In step 10, the EES may request new certain functions from the 5GC. For example, multiple UEs may send a trigger for a local AMF; as such, the EES may request the 5GC to instantiate an AMF locally at the edge data network where the EES resides. For this purpose, the EES may provide 5GC with the following information: Network Slice Selection Assistance Information (N-SSAI), UE-ID (5G-GUTI, SUPI), application ID. If the EES requests the 5GC to instantiate a new SMF or UPF at the edge data network, session related context information may be provided to the 5GC. In step 11, the 5GC may send a response to the EES. The response may include one or more network parameters. For example, if step 10 comprises requesting to instantiate an AMF or an AMF instance, the response may include AMF name, AMF ID (GUAMI), S-NSSAI that the AMF supports, AMF instance ID, AMF service area, etc.

Figure 9:
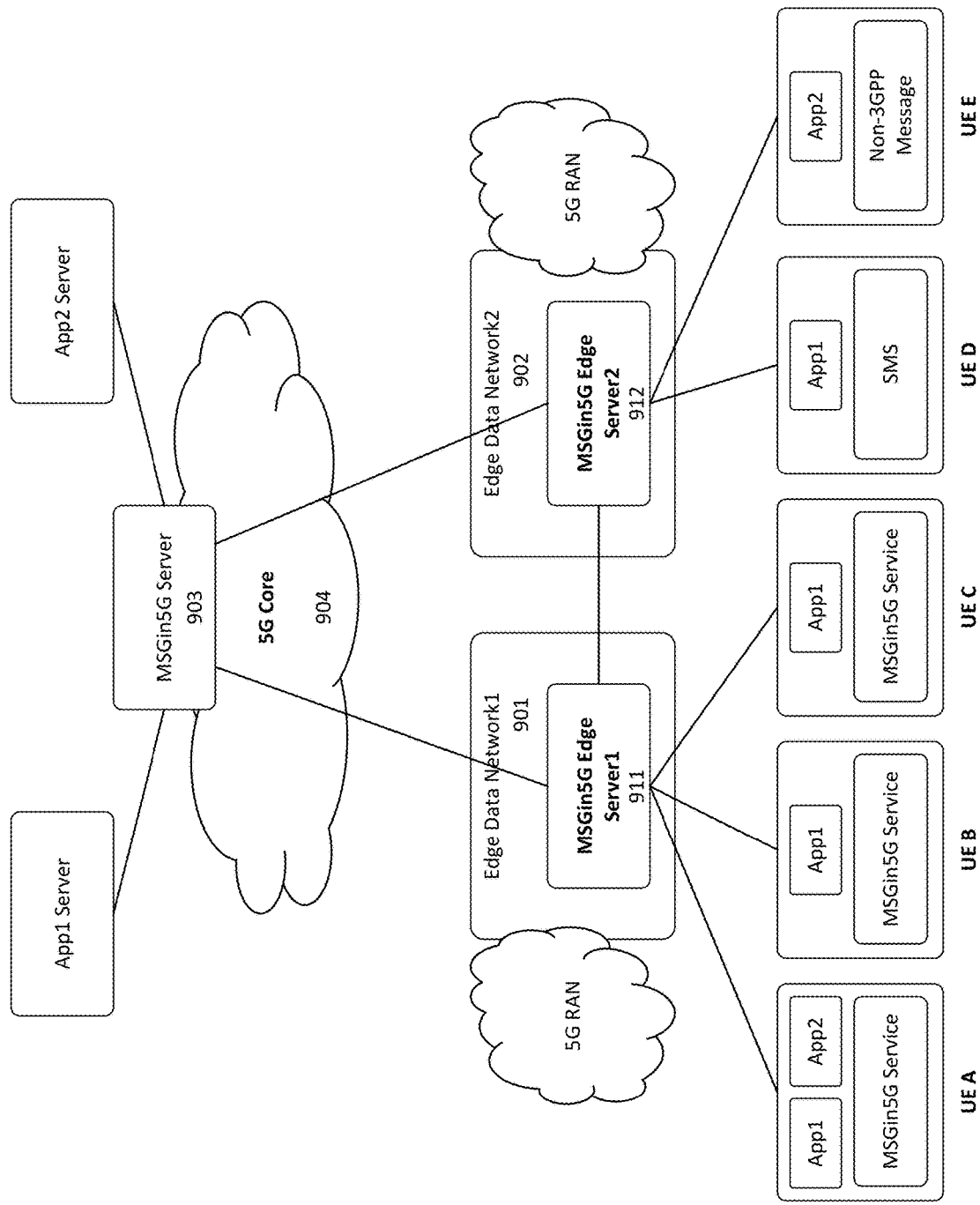
FIG. 9 illustrates an edge-assisted MSGin5G service.

FIG. 9 shows an example edge-aware MSGin5G service 900. The edge-aware MSGin5G service 900 may support the following functions.

Each edge data network may have one or more MSGin5G Servers, such as MSGin5G Edge Server1 911 in edge data network1 901 and MSGin5G Edge Server2 912 in edge data network2 902.

The MSGin5G Server 903 in the 5GC 904 may coordinate, manage and control the MSGin5G Edge Servers in the edge data networks. For example, MSGin5G Server 903 may request the NFDM to create MSGin5G Edge Server1 911 and MSGin5G Edge Server2 912. MSGin5G Server 903 may configure MSGin5G Edge Server1 911 to reports its status periodically to MSGin5G Server 903. MSGin5G Server 903 may configure MSGin5G Edge Server1 911 to only serve a list of allowed UEs and applications.

MSGin5G Edge Servers can be leveraged to reduce message delivery latency and overhead, especially for point-to-point messages between two or more UEs within the same location (e.g. a future connected factory). In FIG. 9, when UE A needs to send a message to UE B for App1, UE A may send the message to MSGin5G Edge Server1 911 first, which may forward the message to UE B. In another example, when UE A needs to may send a message to UE D, the message may pass through the following entities sequentially: UE A, MSGin5G Edge Server1 911, MSGin5G Edge Server2 912, UE D. Note than in order to route messages between MSGin5G Edge Server1 911 and MSGin5G Edge Server2 912, one of them or both could contact core network to determine the service edge server based on the location. For instance, MSGin5G Edge Server1 911 may know the address and other access information about MSGin5G Edge Server2 912 from core network by giving the location where MSGin5G Edge Server2 912 resides.

Each MSGin5G Edge Server may register itself to MSGin5G Server 903 or an NRF. For the latter, MSGin5G Server 903 can find MSGin5G Edge Servers in an edge data network from the NRF. Any NF consumer and application can also look up MSGin5G Edge Servers in a specific location from NRF or MSGin5G Server 903. When a UE attaches to 5G network (or when a UE establishes a PDU session), the UE can request for and/or be assigned with a MSGin5G Edge Server 903.

If App1 needs to send a group/broad message to all four UEs, App1 first may send the message to MSGin5G Server 903. MSGin5G Server 903 may forward the message to MSGin5G Edge Server1 901 and MSGin5G Edge Server2 902 separately. Then, MSGin5G Edge Server1 901 may multicast/broadcast the message to UE A and UE B using any available local multicast/broadcast mechanism.

If a UE needs to send a message to both UE B and UE C, UE A first unicasts the message to MSGin5G Edge Server1 911, which then multicasts the message to both UE B and UE C.

When MSGin5G Server 903 needs to establish a group, it may first contact MSGin5G Edge Servers (e.g. MSGin5G Edge Server1 911 and MSGin5G Edge Server2 912) to establish some sub-groups. Sub-groups being established by MSGin5G Edge Servers can be reported to and merged by MSGin5G Server to create various groups.

If App1 is deployed at edge data network 1 and it needs to send a message to UE A (or UE B, or UE C), it first may send the message to MSGin5G Edge Server1 911, which may forward the message to UE A (or UE B, or UE C).

Figure 10:
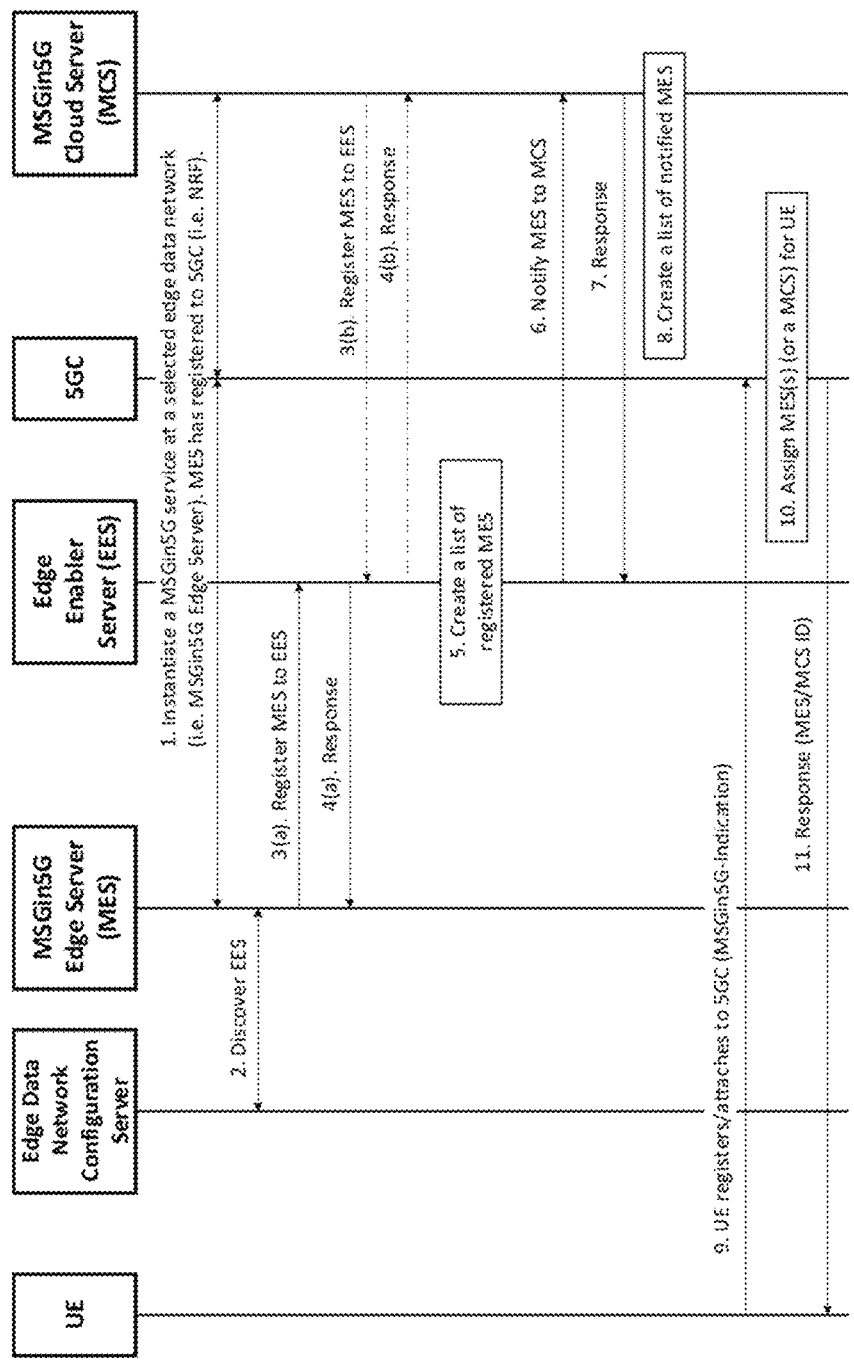
FIG. 10 illustrates a MSGin5G edge server enablement.

FIG. 10 shows an example procedure for MSGin5G Edge Server (MES) enablement, where a new MES is instantiated and registers to an EES 1000. In step 1, a MSGin5G Cloud Server (MCS) and 5GC (e.g. the new Distributed Network Function Manager in FIGS. 15-17) may facilitate to deploy a new MES in an edge data network. During this process, MES may register itself as a network function to Network Repository Function (NRF) and MES may be provisioned with the address of an edge data network configuration server. In step 2, the MES may discover the EES from the edge data network configuration server. In step 3, the MES may register with the EES by indicating its capability (e.g. maximum number of processed messages per second, maximum number of UEs or applications to be supported, etc.). The MES may also indicate the MCS's address to the EES. Alternatively, the MCS may register the MES to the EES. As a result, the EES may actively contact the MES for confirmation and notification after receiving the MCS's request in step 3(b). In step 4: EES may send a response to MES (or MCS). In step 5, the EES may generate a list of registered MESs including their addresses, their capabilities, and corresponding MCSs' addresses. In step 6, the MES registration is from the MES itself, the EES may send a notification to the MCS to indicate the successful registration of the MES. Note that EES may also send the same notification to 5GC so that 5GC can maintain a list of successfully registered MES. In step 7, the MCS may send a response to the EES. In step 8, the MCS may generate a list of MESs which have successfully registered to the EES and are ready to be leveraged as an edge service. In step 9, whenever a UE registers and/or attaches to 5GC, it may indicate its willingness and preference on knowing any MES close to its location. Alternatively, the 5GC may actively send a configuration update message indicating the same information as included in step 11. In step 10, the 5GC may select and may assign MES/MCS to UE based on its willingness and preference as indicated in step 9. In step 11: 5GC may send the address of assigned MES/MCS to UE.

Figure 11:
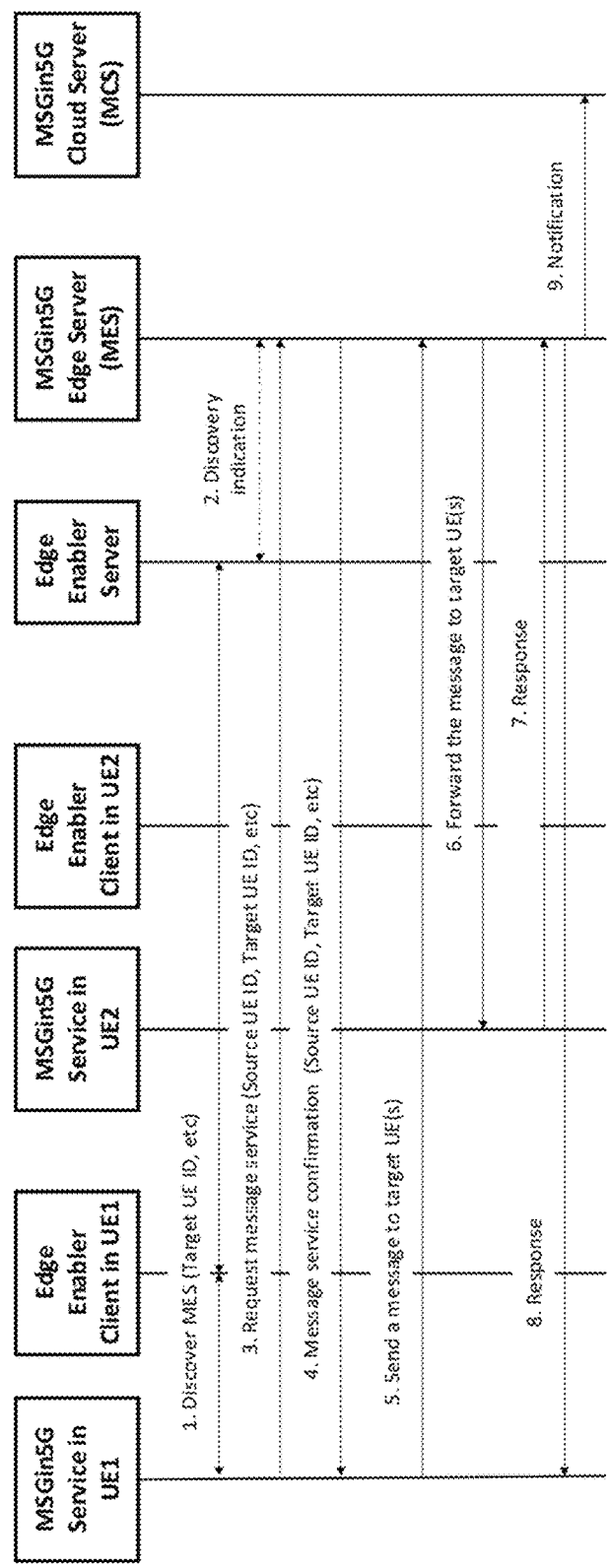
FIG. 11 illustrates edge-assisted message delivery.

FIG. 11 shows an example of edge-assisted message delivery 1100. In the example of FIG. 11, the EES facilitates a UE to discover a MES, which in turn may help a source UE to send a message to a destination UE without relaying by MCS in the cloud. FIG. 11 also shows that both UEs are served by the same MES. The procedure in FIG. 11 can be extended to support the scenario where UE1 and UE2 are served by different MESs (e.g. MES1 serves UE1 and MES2 serves UE2); for this scenario, UE1 and UE2 first discovers MES1 and MES2 independently; then MES1 and MES2 can discover each other from MCS and/or from EES and determine if they can communicate with each other directly without going to MCS; if MES1 and MES2 can communicate with each other directly via edge data networks, UE1 and UE2 can send messages to each other via MES1 and MES2 without going to MCS. In step 1, the MSGin5G Service in UE1 may send a discovery request to the EEC in UE1, which in turn forwards the request to the EES for discovering a MES. UE1 as the source UE may include its identifier and target/destination UE identifiers (e.g. UE2) in the discovery request. The EES may look up its local MES list to find one or more appropriate MES for the source UE (i.e. UE1) and may send a response to EEC in UE1, which forwards the response to MSGin5G Service in UE1; the response includes the identifier of discovered MES. In step 2, the EES may send an indication to the MES that it has been discovered by UE1 for the purpose of sending messages to UE2. In step 3, the MSGin5G Service in UE1 may send a message service request to the MES indicating the source UE identifier and target UE identifiers. There may be multiple target UE identifiers contained in this request. In step 4, the MES may approve (or reject) the message service request. The MES may approve the request for some target UE identifiers while rejecting other target UE identifiers. The MES may send a message service confirmation to UE1's MSGin5G Service indicating the approval or rejection result. If MES rejects all target UE identifiers, steps 5-9 may be skipped. In step 5, the MSGin5G Service in UE1 starts to send a message to MES. The message targets one or more target UEs and their identifiers may be contained in the message. If the message is for multiple target UEs, UE1 may indicate different message delivery priority for each target UE, based on which MES may forward the message first to target UE(s) with a higher priority. This message may comprise multiple segments and each segment is for a different target UE. In step 6, the MES may forward the message all target UEs as contained in step 5. The MES may forward the same message to each UEs one by one. IF the message in step 5 comprises multiple segments, the MES may forward each segment to the corresponding target UE(s) sequentially and/or based on any message delivery priority as contained in step 5. The MES may also leverage a multicast capability of the underlying network to send the message once to all target UEs in MES's coverage. In step 7, each target UE may receive the forwarded message from MES and may send a response to MES. Each target UE may indicate to the MES if the message arrival rate to the target UE should be increased, decreased or it does not matter. In step 8, the MES may send a response to the source UE (i.e. UE1). The MES may instruct UE1 to increase or decrease the message generate rate via this response message. MES may also instruct UE1 to start to use a different MES/MCS via this response message. In step 9, in order to make the MCS have a global view on all locally delivered messages between the source UE and target UE, the MES may send a notification to MCS. The MES may send a separate notification to the MCS for each delivered message or one notification could cover multiple delivered messages.

Figure 12:
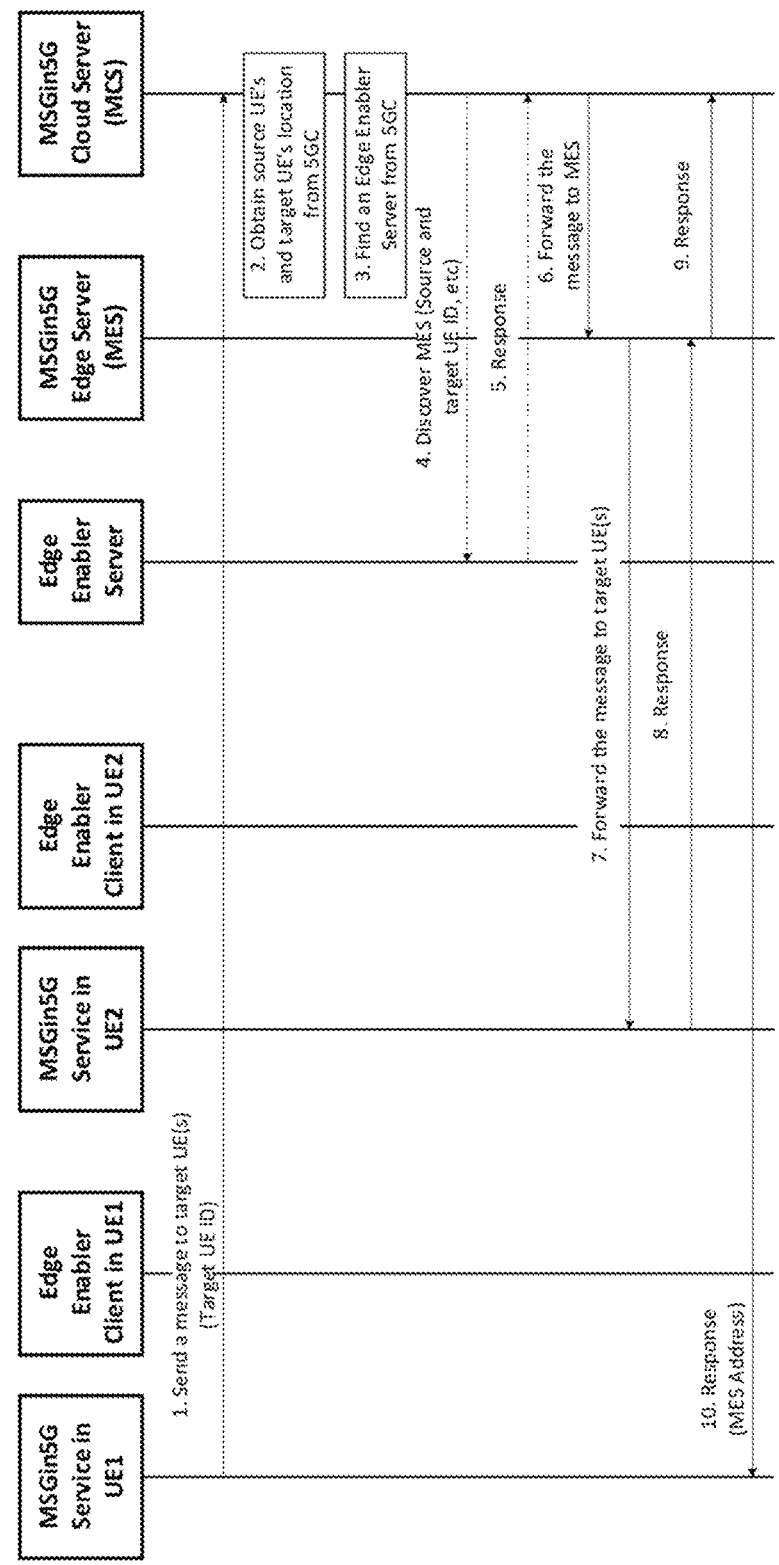
FIG. 12 illustrates edge-assisted message delivery.

FIG. 12 another example for edge-assisted message delivery where MCS first may receive a message from a source UE and then decides to use a MES 1200. In step 1, UE1, as a source UE, may send a message to MCS. This message may comprise information indicating one or multiple target UE identifiers and information indicating a location of the one or multiple target UE identifiers. In step 2, the MCS may obtain the location information about the source UE and the target UEs from the 5GC or alternatively from the message in step 1. In step 3, the MCS may find an appropriate EES from 5GC based on the location information of the source UE and target UEs. In step 4, the MCS may discover an appropriate MES from EES giving the source UE identifier and target UE identifiers. In step 5, the EES may send a discovered MES address or identifier to the MCS. In step 6, the MCS may forward the message as received in step 1 to the MES. The MCS may indicate how the MES should forward the message to each target UE (e.g. priority, retransmission times for each target UE, store the message locally or not and under which condition, etc.). In step 7, the MES may forward the message to the target UEs according to the instruction received in step 6 from the MCS. In step 8, the target UE(s) may send a response to MES. In step 9, the MES may send a response to MCS. The MES may indicate: 1) the identifiers of target UEs which have (and/or have not) received the message; 2) if MES can help to forward messages for the source UE in future; and/or 3) if the MES can accept to receive future messages directly from the source UE. In step 10, the MCS may send a response to the source UE (i.e. UE1). In this response message, MCS may comprise MES's identifier or address to indicate that the source UE can send future messages directly to MES.

The ENRF may receive edge network/server registration requests from ENC and may generate ENSC records. Then, ENRF may send automatic notifications about new ENSC records to any NF consumer which has made subscription to ENRF. When ENRF may receive a request for discovering ENSC records from a NF consumer (e.g., ENC, NFDM, other NFs, SCS, AF, etc.), it first searches its local ENSC records to answer the request; if needed, ENRF may contact ENC to check any missing and/or up-to-date ENSC which does not exist locally at ENRF, trying to answer the request with a more complete and accurate answer.

Figure 13:
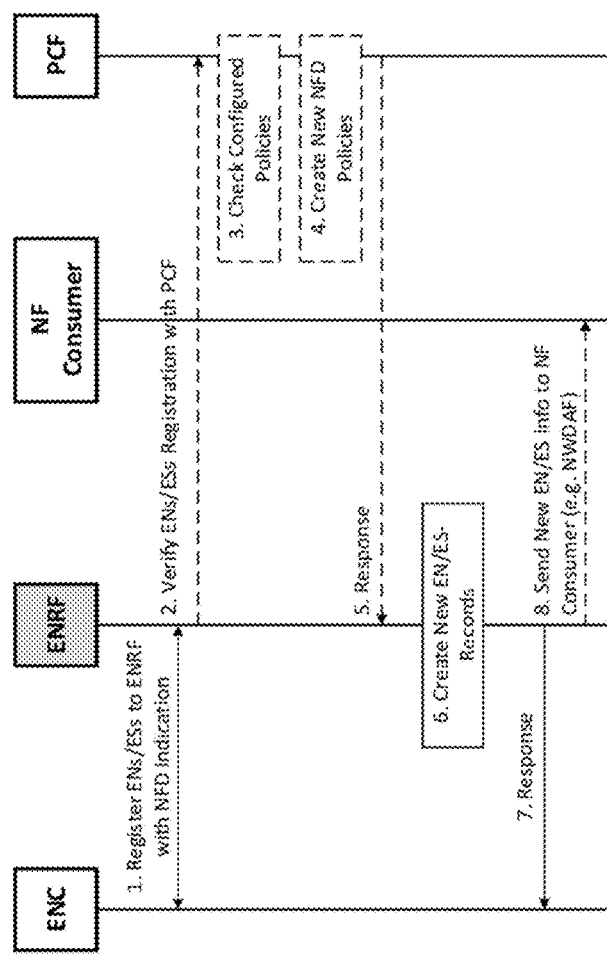
FIG. 13 illustrates edge network/server registration with NFD indication.

FIG. 13 shows an example procedure for edge network/server registration with NFD indication 1300. In this procedure, the ENC registers one or more Edge Networks (ENs) and their Edge Servers (ESs) with the ENRF. The ENC may also indicate if and how each edge network/server can support NFD. In step 1, the ENC may register the ENs/ESs with the ENRF with an NFD-Indication. The ENC may send an EN/ES registration request to the ENRF. If the ENRF resides within the core network as an NF or a part of NRF, the ENC may first send the EN/ES registration request to a NEF which then forwards the request to ENRF. The EN/ES registration request may comprise EN/ES-Info and the NFD-Indication. The ENRF may receive the EN/ES registration request and may process it by decoding the EN/ES-Info and NFD-Indication.

The EN/ES-Info may include a list of edge networks (e.g., their names and/or identifiers), the capability of each edge network, a list of edge servers deployed in each edge network (e.g., their names, identifiers, and/or addresses), the capability of each edge server (e.g., a list of supported edge applications, a list of supported UEs), service area of each edge network, applications available in each edge network, service schedule for each edge network, etc.

The NFD-Indication may indicate if an edge network supports NFD, if an edge server supports NFD, which type of NFs an edge network can host, which type of NFs an edge server can host, what time and how long an edge network can host an NFD, what time and how long an edge server can host an NFD, if an edge network can store NFD policies and generate NFD triggers based on NFD policies, if an edge server can store NFD policies and generate NFD triggers based on NFD policies, etc.

In step 2, the ENRF may send a request to the PCF (e.g., via the interface Npcf or Rx, or via the NEF) to verify whether there is any EN/ES-related policies. For example, some edge networks or edge servers may not be allowed to register with ENRF and/or are only allowed for registration for a limited time. This request may comprise the full or partial EN/ES-Info and NFD-Indication as received in step 1. PCF may need to check with UDM/UDR for authentication and authorization. In step 3, the PCF may receive the request from ENRF. The PCF may process the request, may compare EN/ES-Info with any configured EN/ES-related policies, and generates a list of allowed ENs/ESs according to the policies. In step 4, the PCF may generate new NFD policies based on NFD-Indication as received from step 2. In step 5, the PCF may send a response to ENRF. This response may comprise the list of allowed ENs/ESs and the created NFD policies. In step 6, the ENRF may receive the response from PCF and especially decodes the list of allowed ENs/ESs, based on which it decides which ENs/ESs can be registered. The ENRF may generate an EN/ES-Record for each allowed and registered edge network and/or edge server. In step 7, the ENRF may send a response to ENC, which includes registration results, such as a list of ENs/ESs allowed for registration, a list of ENs/ESs declined for registration, etc. In step 8, if any NF consumer (e.g. NWDAF) has subscribed to ENRF for receiving a notification on any newly registered EN/ES, ENRF may send a notification to NF consumer. The notification may comprise a list of registered ENs/ESs as NF consumer has subscribed for.

Figure 14:
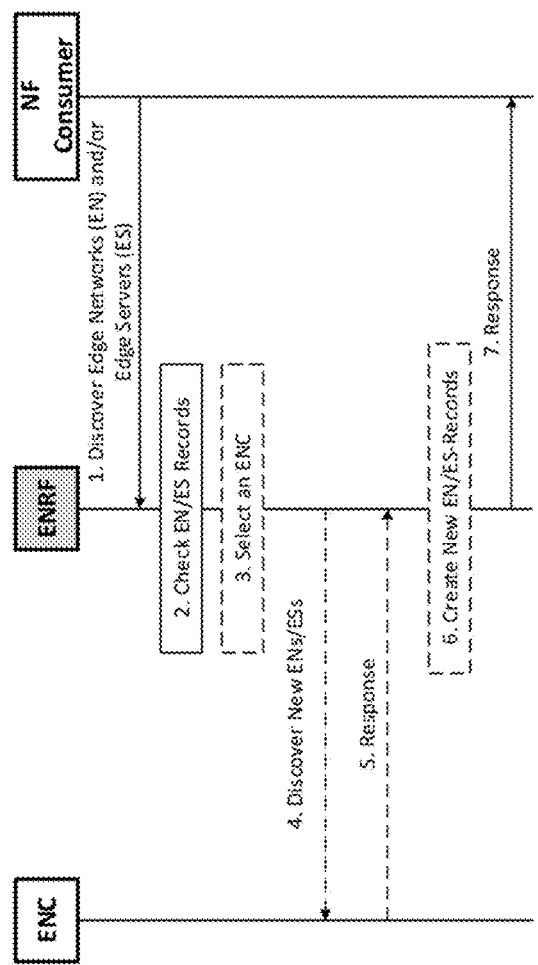
FIG. 14 illustrates edge network/server discovery.

FIG. 14 shows an example procedure for discovering edge networks and/or edge servers 1400. In step 1, an NF Consumer may send an EN/ES discovery request to ENRF in order to discover one or more edge networks and/or edge servers. This discovery request may comprise a discovery filter, which may indicate some conditions, for example, the location of edge networks and/or edge servers, the type of edge applications which edge networks and/or edge servers host, the services which edge networks and/or edge servers provide. In step 2, the ENRF may look up its EN/ES-Record against the discovery filter as received in step 1. In step 3, the ENRF may select and contact an ENC to discover more ENs/ENs assuming ENC has information of some ENs/ESs which it manages. In step 4, the ENRF may send an EN/ES discovery request to ENC. This request may comprise the same discovery filter as received in step 1. The ENC may look up its local EN/ES database to find any suitable EN/ES which matches the discovery filter. In step 5, the ENC may send a response to ENRF indicating any newly found edge networks and/or edge servers in step 4 and their capabilities. This step can may also register these new edge networks and/or edge servers, similar to step 1 in FIG. 13. In step 6, if the ENRF receives new edge networks and/or edge servers, the ENRF may generate new EN/ES-Records for them. In step 7, the ENRF may send a response to the NF consumer, which may comprise a list of discovered edge networks and/or edge servers, which are found in step 2 and received from step 5.

The proposed edge-aware network function distribution is policy-based and NFDM-coordinated, which includes several techniques describe herein:

Configuration of NFD Policies (shown in FIG. 16): An Application Function (AF) (or 3GPP OAM system) may generate/may configure some NFD policies to the PCF. The PCF may pass NFD polices to NFDM. Then, either the PCF or the NFDM may store new NFD policies to UDR, may notify the NRF of new NFD policies, may notify a NFx of NFx-specific NFD policies, may configure new NFD policies to the ENC and/or relevant edge servers, and may push NFD policies to UE. Logical entities (e.g. UE, ENC, NFx, NRF, etc.) as NF consumer may also discover NFD policies from PCF or NFDM.

Generation of NFD Triggers (shown in FIG. 17): Either a UE, a specific NFx, ENC, and/or an NFDM may generate an NFD trigger based on NFD policies they maintain locally. In addition, the NFDM may receive automatic notifications about context changes about edge data networks/servers from NWDAF or ENRF; as a result, the NFDM can generate NFD triggers. If the NFD triggers are generated by entities other than NFDM, they may be first sent to the NFDM; then, the NFDM may verify these NFD triggers with the PCF. Only after a new NFD trigger is verified, the NFDM may start the NFD process.

Distributing Selected NFs to Selected Edge Networks (shown in FIG. 18): After a locally generated or a received NFD trigger is verified, the NFDM may start an NFD process in order to create a requested NF at an appropriate edge data network. The NFDM may first check with the NRF in order to select an appropriate NF to be distributed to edge networks/servers; it may contact ENRF in order to discover and select an appropriate edge network/server. Then, NFDM may directly or through other entities such as the NFVO to install the selected NFx to the selected edge network/server. After the requested DNFx is successfully created, the NFDM may send a notification to the NRF for registering the DNFx and/or may send another notification to the corresponding centralized NFx. The NFDM may also provide additional configuration information to DNFx (e.g., address of NRF, address of corresponding centralized NFx, address of NFDM, etc.).

Leveraging DNF in Edge Networks (shown in FIG. 19): After the DNFx is successfully created at an edge data network, the UE may discover it from the notification from NFDM or from ENC which may advertise DNFx periodically. The UE may start to use the DNFx directly or via a local NEF, for instance, to enable directly communications with edge applications in the same edge network for performance improvement. In the meantime, the DNFx may send periodical reports to the NFDM (or NWDAF) to indicate the communication records and statistics between the DNFx and the UE and/or between DNFx and other entities. The NFDM may forward these reports to the NWDAF for data analytics, to the NRF for updating DNFx's context information, and/or to the corresponding centralized NFx. Alternatively, DNFx may send periodical reports directly to the corresponding centralized NFx.

Deactivation of Distributed Network Function (shown in FIG. 20): the NFDM may decide to remove or deactivate an existing DNFx based on NFD policies. Then, it may contact the DNFx directly or via other entities such as the NFVO for deactivating the DNFx. The DNFx (or the NFDM) may send a deactivation notification to UEs, corresponding to the CNFx and/or NRF. Alternatively, the CNFx could initiate to remove or deactivate its DNFx. After receiving a deactivation notification from DNFx (NFDM or ENC), the UE may resume to use a centralized NFx or alternatively use another new DNFx if the UE is notified of another new DNFx by the ENC, the NFDM, and/or the current DNFx.

Interaction between DNFs and corresponding CNF (shown in FIG. 21): A CNF may have multiple corresponding DNFs (e.g. DNF1 and DNF2) being created in edge data networks. The CNF may subscribe to each DNF for receiving automatic notifications on selected information about each DNF; such selected subscription and notification could be triggered by CNF itself or another NF consumer (e.g. NWDAF). When the CNF receives a service request from a NF consumer, the CNF may first attempt to use its local information to answer the service request. If the CNF needs to collect additional information in order to serve the original service request from the NF consumer, the CNF may first adapt the service request and may select one or more DNF from its DNF set. Then, the CNF may send the adapted service request to each selected DNF. The CNF may combine received responses from DNFs with its local response to generate a final response to the NF consumer.

Figure 15:
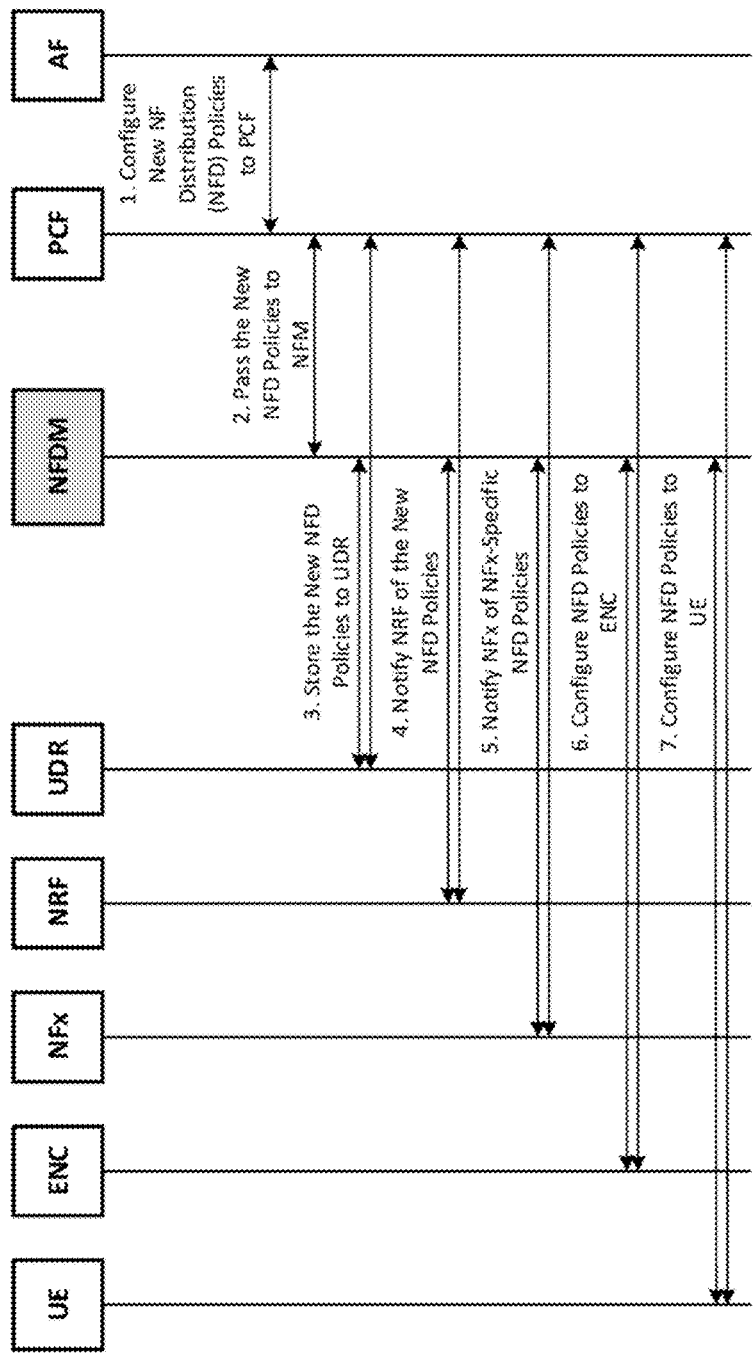
FIG. 15 illustrates NFD policy configuration.

FIG. 15 shows an example procedure for configuring NFD polices 1500. In step 1, an AF (or 3GPP OAM system) may send a request to PCF to create/configure new NFD policies. The PCF may receive the request and may generate some new NFD policies as requested; the PCF may generate a policy identifier for each created NFD policy. Then, the PCF may send a response to the AF indicating whether the new NFD policies have been successfully created at the PCF. Each NFD Policy may comprise four elements as described in Table 3 below: NFD-Policy-ID, Target-NF, NFD-Condition, and NFD-Action. For each NFD policy, PCF may include one or more NFDM addresses into NFD-Action. Note that PCF can discover NFDM from NRF. Examples of NFD Policies could be:

NFD-Policy #1: NFD-Policy-ID="NFDPolicy01", Target-NF="AMF", NFD-Condition="The frequency of concurrent messages (e.g. registration requests and service requests) that an AMF may receive from UEs within a location exceeds a threshold", and NFD-Action="Generate a NFD trigger for distributing an AMF to a selected edge network within the location & send the NFD trigger to NFDM".

NFD-Policy #2: NFD-Policy-ID="NFDPolicy02", Target-NF="AMF", NFD-Condition="The number of RM-REGISTERED UEs within a location exceeds a threshold", and NFD-Action="Generate an NFD trigger for distributing an AMF to a selected edge network within the location & send the NFD trigger to NFDM".

NFD-Policy #3: NFD-Policy-ID="NFDPolicy03", Target-NF="NWDAF", NFD-Condition="A UE requests for a local area data network and a local UPF has been assigned to the UE as a part of session management", and NFD-Action="Generate a NFD trigger for distributing an NWDAF to the local area data network to collect data from the local UPF and provide UPF data analytics & send the NFD trigger to NFDM".

NFD-Policy #4: NFD-Policy-ID="NFDPolicy04", Target-NF="AMF, SMF, UPF", NFD-Condition="An CIOT device communicates with an edge application using control plane", and NFD-Action="Generate a NFD trigger for distributing all NFs on the control plane to the edge network where the edge application resides & send the NFD trigger to NFDM".

In step 2, the PCF may send newly created NFD polices including their identifiers to NFDM. NFDM may send a response to PCF as a confirmation of receiving these NFD policies. In step 3, the PCF (or NFDM) may store newly created NFD policies to the UDR, from which any NF consumer can search and retrieve NFD policies. In step 4, the PCF (or NFDM) may notify the NRF of new NFD policies but may only send their NFD-Policy-ID and Target-NF to the NRF. As a result, NRF could actively generate an NFD trigger after receiving data analytics results from NWDAF about a specific NF, by comparing the received data analytics results against NFD-Condition. In step 5, if the Target-NFD of a newly created NFD policy is "NFx", the PCF (or the NFDM) may send this NFD policy to the NFx. As a result, NFx can evaluate NFD-Condition based on its local information and generate NFD triggers by itself; alternatively, NFx can also subscribe to NWDAF to receive notification on some data analytics results, which may be used to compare with NFD-Condition. In step 6, the PCF (or the NFDM) may configure some NFD policies to an ENC, which may be an edge network controller, a software-defined network controller, an edge enabler server, a base station, an access network gateway/router, etc. In step 7, similar to step 6, the PCF (or the NFDM) may configure some NFD policies with a UE so that the UE can, based on the configured policies, automatically trigger to create a distributed network function at an edge data network. The policy may be sent to the UE from the PCF using the NAS connection via the AMF. Alternatively, this step may take place when a UE registers with an AMF (either initial registration, periodical registration, and/or registration update), when a UE establishes a N1 connection with an AMF (i.e. service request), when an AMF performs UE configuration update procedure, when a UE establishes a PDU session with SMF, etc. As a result, UE could actively generate NFD triggers by itself and send them to NFDM.

The following table shows key elements of an NFD policy.

TABLE 3

Key Information Elements of a NFD Policy

| Information Elements | Description |
|---|---|
| NFD-Policy-ID | The identifier of an NFD policy. |
| Target-NF | The type of NF to be distributed or an NF instance to be distributed. |
| NFD-Condition | The condition for generating an NFD trigger. |
| NFD-Action | The action if NFD-Condition meets. Usually, NFD-Action would be to generate an NFD trigger and send it to a NFDM. The address of the NFDM could be contained in the policy or it can be discovered from NRF. |
| Other Parameters | Application that are supported by the new NF, the maximum number of UEs supported by a new NF, the maximum number of data rate supported by the new NF, service area information of the new NF, the maximum number of such NFs (instance) that can be created in an edge network, the type of network slice (or S-NSSAI) that should be supported by the NF. |

Figure 16:
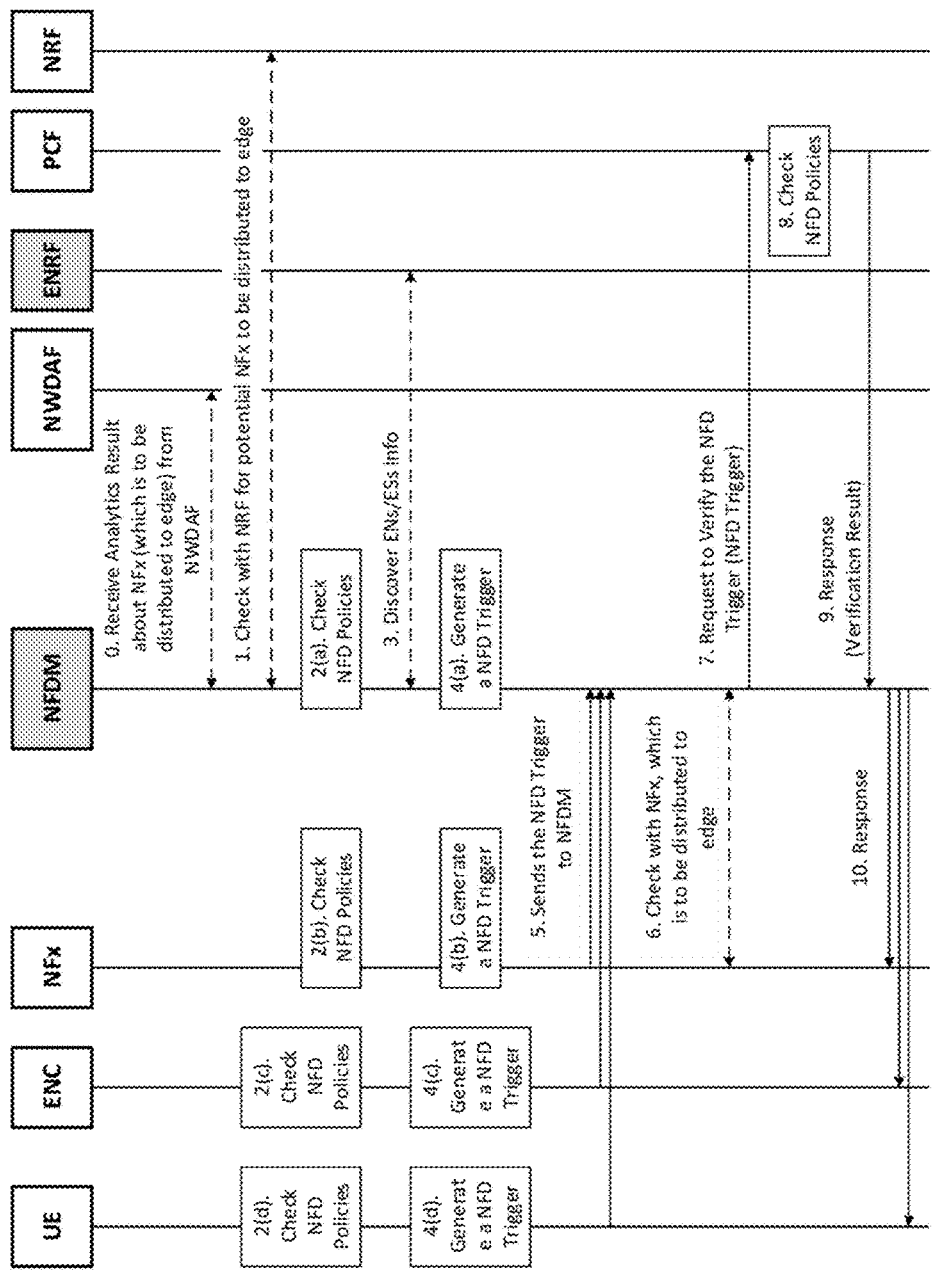
FIG. 16 illustrates a process for generating NFD triggers.

FIG. 16 illustrates a procedure for generating NFD triggers 1600. In general, logical entities such as NFDM, NFx, ENC, and/or UE may automatically generate NFD triggers based on configured NFD policies and/or local analytics results or received from NWDAF. In step 0, assume that the NFDM has subscribed to NWDAF. The NFDM may receive analytics results from NWDAF about a NFx. For example, NFDM may have subscribed to NWDAF to get predictive analytics result on the location where the number of UEs an AMF (i.e. NFx=AMF in this case) may serve is the maximum. In step 1, the NFDM may check with NRF to get a list of existing NFx, which could be distributed to edge networks. The NRF may send a list of existing NFx including their status to NFDM. For example, the NFDM may discover a list of existing AMF (or UPF) including their status from NRF. In step 2, the NFDM, the NFx, ECN, and/or the UE may check their locally stored NFD policies in order to generate an NFD trigger in step 3. For example, the NFDM may check its NFD policies against the predictive analytics result received from step 0. In step 3, the NFDM may contact the ENRF to discover candidate edge networks and/or edge servers for hosting a DNF to be created. For example, if the predictive analytics result from step 0 is UE-related location information, the NFDM may present the location information to ENRF; as a result, the ENRF may return a list of candidate edge networks and/or edge servers to the NFDM. From this list, the NFDM may select one or multiple edge networks and/or edge servers to be included in the NFD trigger to be generated in step 4.

In step 4, after checking NFD policies in step 2, the NFMD/NFx/ENC/UE may generate an NFD trigger, which could be to create a DNF instance at a location as a new NF or to create a DNF instance at a location for an existing NFx. If the trigger is to create a DNF instance as a new NF (i.e. there is no such a peer NF instance in 5GC), step 6 may not be needed. For example, the NFDM may generate a DNF trigger to create a new AMF instance for an existing AMF in 5GC, at a selected edge network or edge server where many UEs suddenly occur and try to connect to mobile core network. In step 5, the NFx, ENC, and/or UE may send the generated NFD trigger to the NFDM. It's assumed that the address of the NFDM is included in the NFD policies and known to the NFx/ENC/UE; otherwise the NFx/ENC/UE can be provisioned with NFDM's address or discover it from NRF. In step 6, if the NFD trigger is to create a DNF instance at a location for an existing NFx (e.g. an AMF in 5GC), the NFDM may check with NFx if it is indeed required to create a DNF instance at an edge network or an edge server. In step 7, the NFDM may verify the NFD trigger with PCF, which was generated in step 4(a) or received from step 5. For this purpose, the NFDM may send a request to PCF indicating the NFD trigger to be verified. In step 8, the PCF may receive the NFD trigger from step 7 and checks its NFD policies to verify if the NFD trigger should be generated or not. In step 9, the PCF may send a response to NFDM indicating the verification result (i.e. if the NFD trigger is valid or not). In step 10, if the NFD trigger was received from step 5, the NFDM may forward the verification result received from step 9 to the sender of step 5 (i.e., NFx, ENC, or UE).

Figure 17:
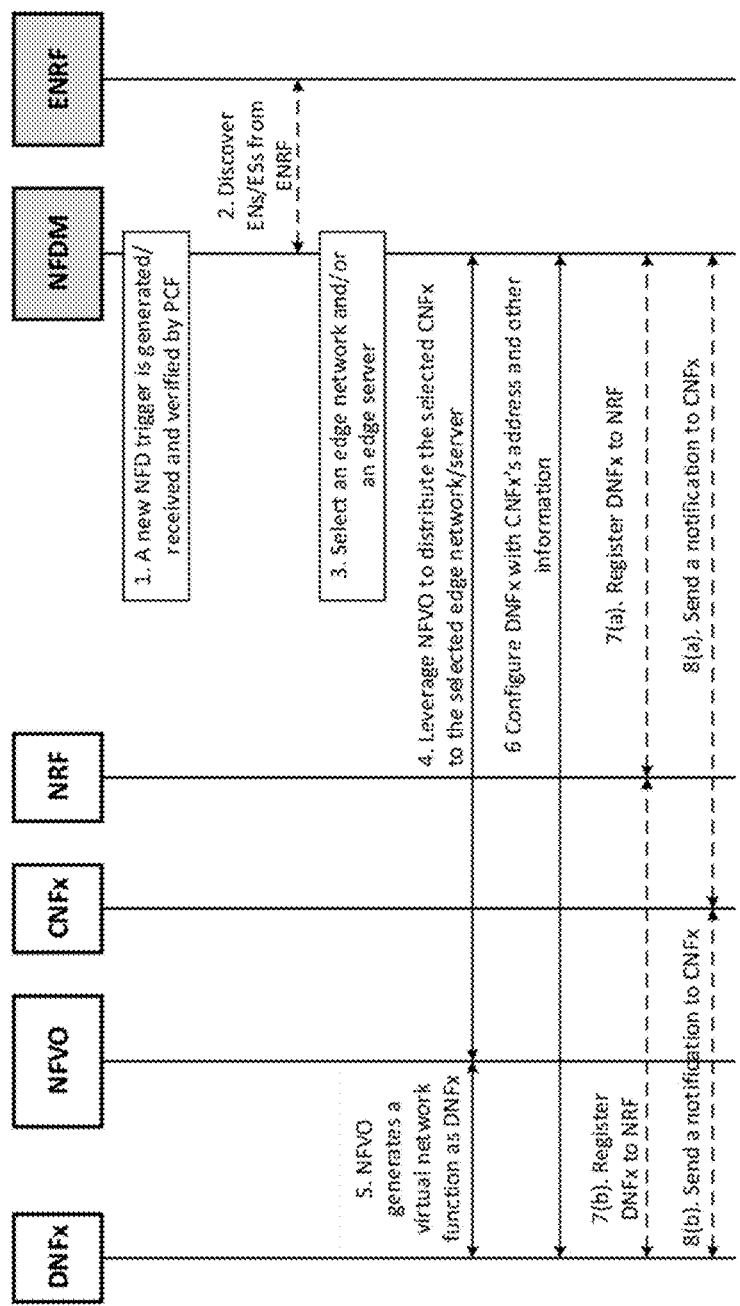
FIG. 17 illustrates a process for distributing a selected NF to a selected edge network.

FIG. 17 shows an example procedure for creating a DNF instance at a selected edge network and/or edge server 1700. In step 1, assume a new NFD trigger be generated at NFDM or received by NFDM and it has been verified by PCF. It is also assumed that this DNF trigger specifies that a new DNF instance (i.e. DNFx) needed to be created at location Loc #1 for an existing centralized NF CNFx or as a new NF of the same type of CNFx. In step 2, the NFDM may discover candidate edge networks and/or edge servers from ENRF, which are deployed at location Loc #1. In step 3, the NFDM may select an edge network and/or an edge server. For example, an edge network/server with the most powerful capability (e.g. computation and storage) and a least load may be selected. In step 4, the NFDM may send a request to the NFVO asking for creating a new DNFx. The request may comprise the type of DNF to be created, the identity/address of the selected edge network and/or the edge server. The NFDM may also indicate its address to the NFVO and request the NFVO to instruct DNFx to contact NFDM once DNFx is created. In step 5, the NFVO may instruct generation of a virtual network function on the selected edge network/server at location Loc #1 using network function virtualization technology. The NFVO may send a response to the NFDM indicating access methods (e.g. IP address and port number) of the created DNFx. It is assumed that the NFVO informs the ENC of the creation of DNFx including their access methods. Note that NFVO is a logic function which could be a part of OAM system. In step 6, the DNFx may contact the NFDM to pull and receive some configuration information (e.g. the identity/address of NRF, the identity/address of CNFx NDFx was created for CNFx, etc.) from NFDM. Alternatively, the NFDM may send a request to DNFx to push such configuration information to DNFx. In step 7, the NFDM or the DNFx may send a request to NRF to register DNFx and its access methods to NRF. In step 8, if the DNFx was created for CNFx, NFDM or DNFx may send a notification to CNFx to inform it the success creation of DNFx including DNFx's access methods. If step 7 did not happen, the CNFx can register DNFx including its access methods to NRF.

Figure 18:
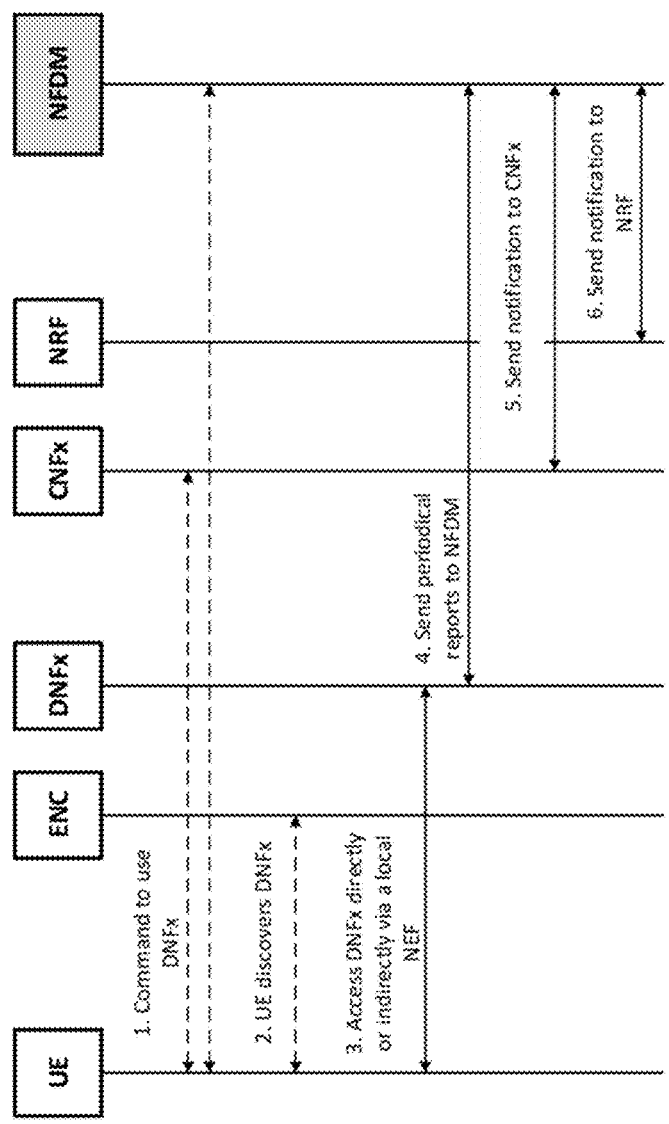
FIG. 18 illustrates a process for leveraging distributed network functions.

FIG. 18 shows an example procedure for a UE to access and leverage a DNF instance (i.e. DNFx) after it is created at an edge network/server 1800. In step 1, the NFDM (or the CNFx, if the UE was accessing CNFx and DNFx was created for CNFx) may send a request to UE indicating access methods of DNFx and instructing UE to leverage DNFx. In step 2, the UE may send a discovery request to ENC. As a result, ENC may send a list of created DNFx at a designated location to UE; for each discovered DNFx, ENC may also send its access methods to UE. In step 3, the UE may start to access the DNFx directly or indirectly via a local NEF. In step 4, the DNFx may send periodical reports to NFDM indicating a list of UEs and/or applications which access DNFx, the rate of received request messages at DNFx, etc. Such reports may also be sent to CNFx, NRF, and/or NWDAF. In step 5, the NFDM may forward periodical reports or the summarized information from periodical reports to CNFx. In step 6, the NFDM may send a notification to the NRF.

Figure 19:
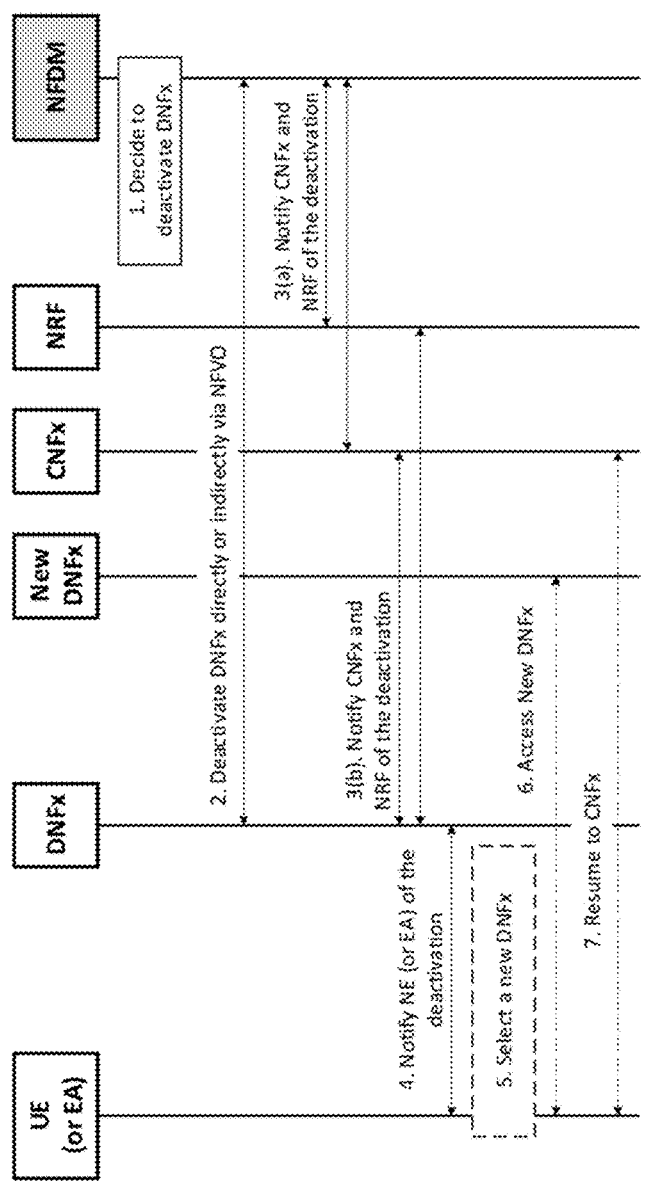
FIG. 19 illustrates a process for deactivation of distributed network functions.

FIG. 19 shows an example procedure for deactivation of removal of a DNF instance (i.e. DNFx) 1900. In step 1, the NFDM may decide to deactivate the DNFx, for example, based on some policies. In step 2, the NFDM may send a request directly to DNFx to deactivate it. Alternatively, the NFDM may send a request to the NFVO to deactivate the DNFx using network virtualization technologies. The request may comprise access methods of another new DNFx. In step 3, the NFDM or the DNFx may notify the NRF (and CNFx, if DNFx was created for CNFx) of the deactivation of DNFx. As a result, the NRF and the CNFx may remove any record or information about DNFx. The NFDM, DNFx or NRF may also notify ENRF the deactivation of DNFx. In step 4, the DNFx may notify the relevant UEs or edge applications of the deactivation of the DNFx and may inform them of other nearby DNFx. In step 5, the UE may select a new DNFx. In step 6, if a new DNFx was selected in step 5, the UE starts to access the new DNFx; otherwise, the UE may resume to access CNFx in 5GC. In step 7, the UE may resume to access CNFx in 5GC.

Figure 20:
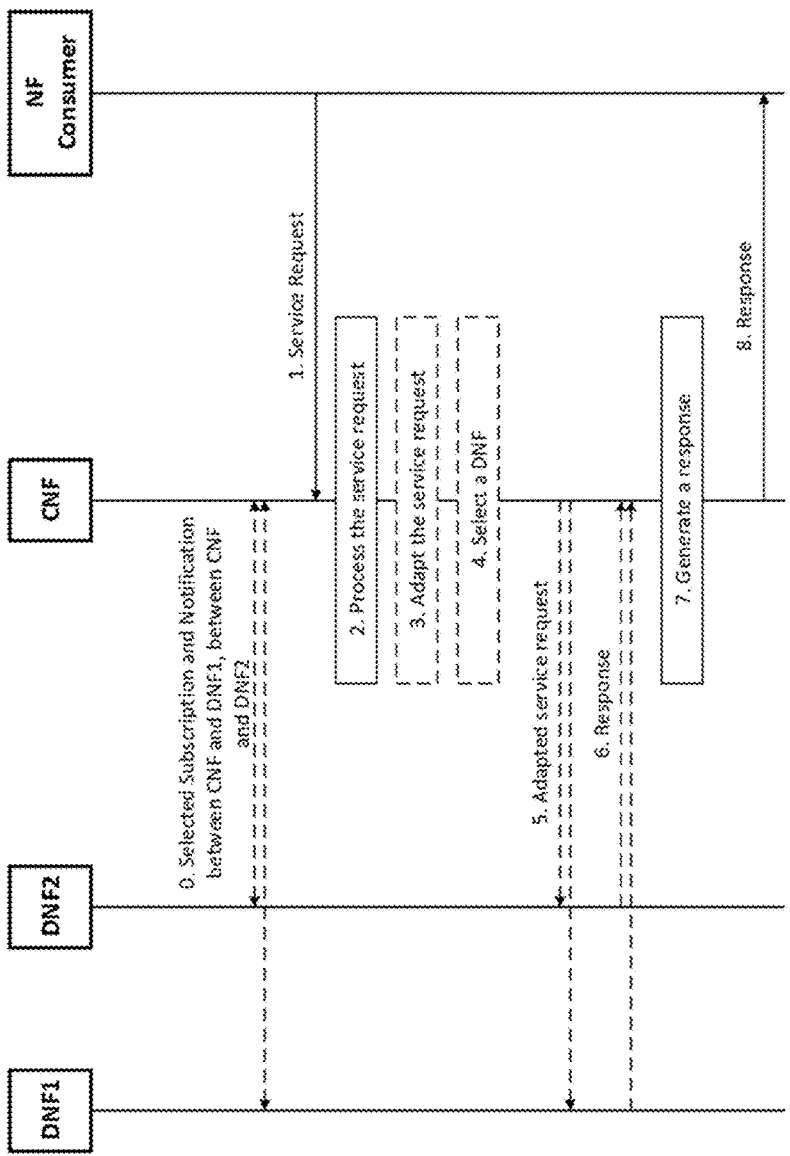
FIG. 20 illustrates interactions between DNFs and CNF.

FIG. 20 shows an example procedure for interactions between a CNF and all its DNFs 2000. In step 0, the CNF may have subscribed to each DNF for receiving automatic notification about their status. In step 1, a NF consumer may send a service request to CNF. In step 2, the CNF may process the service request to authorize it. In step 3, the CNF may adapt the service request, for example, to decompose it to several adapted service requests. Each adapted service request can be served by a DNF. In step 4, the CNF may select an appropriate DNF for each adapted service request. In step 5, the CNF may send adapted service requests to the selected DNFs. In step 6, the CNF may receive responses from DNFs. In step 7, the CNF may generate a new response based on all responses from DNFs. In step 8, the CNF may send the new response to the NF consumer.

Figure 21:
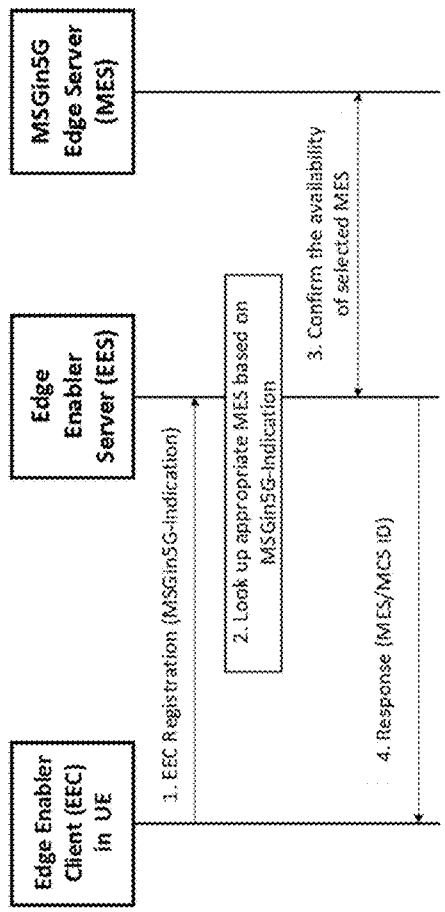
FIG. 21 illustrates an enhanced edge enabler client registration for indicating MSGin5G.

FIG. 21 shows an example procedure for the enhanced EEC registration 2100. In step 1, the EEC may send a registration or a registration update to the EES indicating the UE's willingness and preference on using MSGin5G service via a parameter MSGin5G-Indication. In step 2, the EES may look up its local data to select appropriate MES for EEC based on MSGin5G-Indication as received in step 1. In step 3, the EES may contact each selected MES to confirm its availability. In step 4, the EES may select and may assign one or multiple available MES for the UE. As such, EES includes the address or identifier of the assigned MES(s) and/or their corresponding MCS in the response message being sent to EEC.

Figure 22:
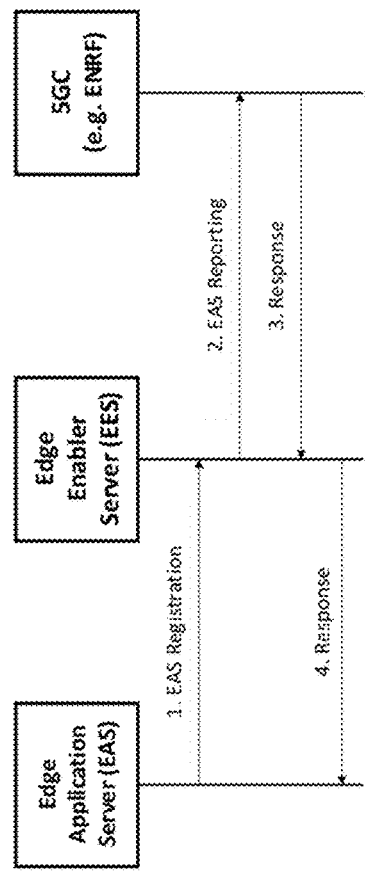
FIG. 22 illustrates an enhanced edge application registration for reporting EAS to 5GC.

FIG. 22 shows an example procedure for the enhanced edge application registration 2200. In step 1, the EAS may send a registration request or a registration update to the EES. The EAS may indicate itself to the EES if the EAS would like to be exposed to 5GC. In step 2, the EES may authorize the registration request. If the request is authorized, the EES may register the EAS. Then, the EES may send a message to 5GC to report this newly registered EAS. As such, 5GC can maintain a list of registered EASs at each EES and accordingly enables any network function consumers or applications to discover EAS (and EES) from 5GC. In step 3, the 5GC may send a response to EES. In step 4, the EES may send a response to EAS and may indicate if EAS has been reported to 5GC.

Figure 23:
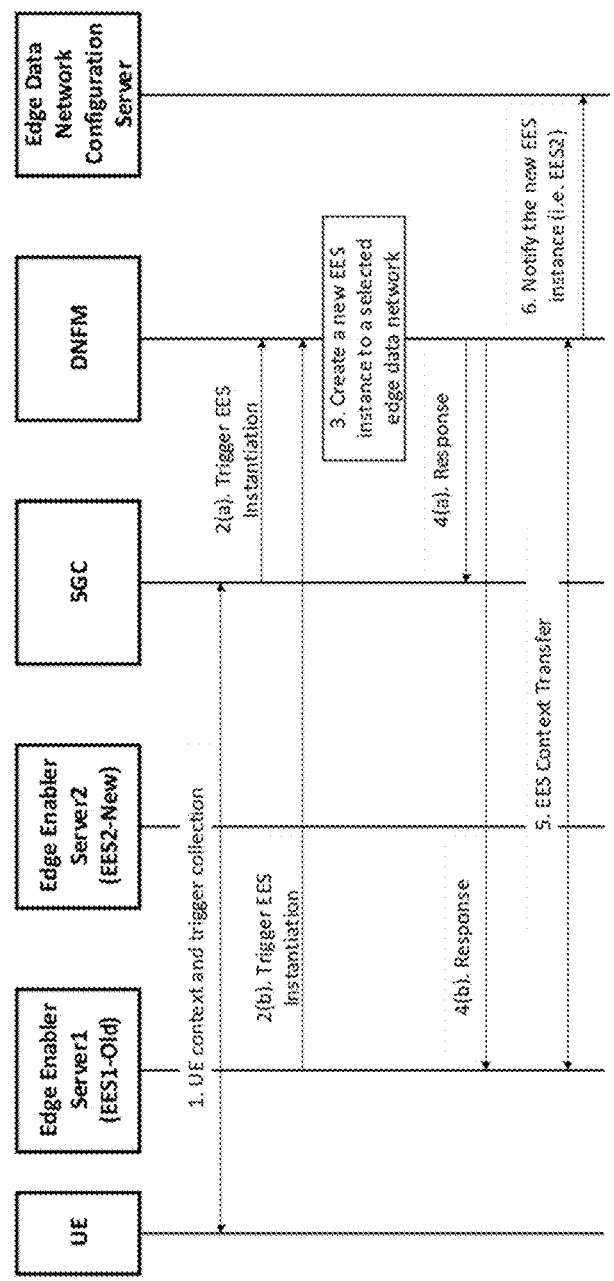
FIG. 23 illustrates an edge enabler server instantiation.

FIG. 23 shows an example procedure for instantiating an edge enabler server 2300. In step 1, the UE may report its context and triggers to 5GC, for example, based on the procedure in FIG. 6. In step 2, either the 5GC or an existing old EES may send a trigger to the Distributed Network Function Manager (DNFM) to request instantiating a new EES. For example, after 5GC may receive context info from multiple UEs, it may determine that there are many UEs suddenly appears in one location and a new EES may benefit these UEs. Note that DNFM could be a part of 5GC. In step 3, the DNFM may generate a new EES instance to a selected edge data network, for example, based on the proposed mechanism for edge-assisted distributed network functions. As a result of this step, a new EES may be instantiated and created at the edge data network. In step 4, the DNFM may send a response to 5GC (or the old EES). In step 5, if the old EES initiates to create a new EES, the old EES may transfer its EES context (e.g. a list of registered edge application servers, a list of registered edge enabler clients) to the new EES. After the new EES may receive the complete context from the old EES, the new EES may contact each EEC and/or each EAS which has registered to the old EES to notify them to contact with new EES in future; alternatively, the old EES could inform each of its EEC and/or EAS of the address of the new EES and instruct them to contact with the new EES for future communications. In step 6, the DNFM may notify edge data network configuration server of the newly instantiated EES. Alternatively, DNFM may have provided the new EES with the address of edge data network configuration server; as such, the new EES can actively contact edge data network configuration server to report its existence.

The ENRF is proposed as a new NF. Each edge network registers their capabilities especially in hosting distributed NFs to ENRF. An NF consumer can discover edge networks and their capabilities from ENRF or from UDR if ENRF stores edge network capabilities to UDR. NWDAF can access edge data capabilities from ENRF and provide analytical results about edge data networks to NF consumers.

The NFDM is proposed as a new NF to control and manage NF distribution. NFM can be deployed as a part of or co-located with NRF.

In order to support distributed NF, each NFx may add a new service (referred to as "NF Distribution"), which allow NF service consumers to trigger NFx to create one or more NFx instances at edge data networks. For example, the following table lists two new services for NWDAF.

TABLE 4

New Services Provided by NWDAF

| Service Name | Description |
| --- | --- |
| Nnwdaf_NFDistribution | This service enables the NF service consumers (e.g. NFM) to trigger NWDAF to create one or more NWDAF instances at one or more edge data networks. |
| Nnwdaf_Sync | This service enabled the created NWDAF instance at edge data network as service consumers to sync up with NWDAF in 5GC. |

A network slice instance is extended to include DNFs, edge servers, and edge data networks. UE can indicate its network slice requirement on edge entities (i.e. edge data network, edge servers, and DNFs). When AMF selects a network slide instance for a UE, it considers not only UE's location, but also UE's network slice requirements on edge entities.

Figure 24:
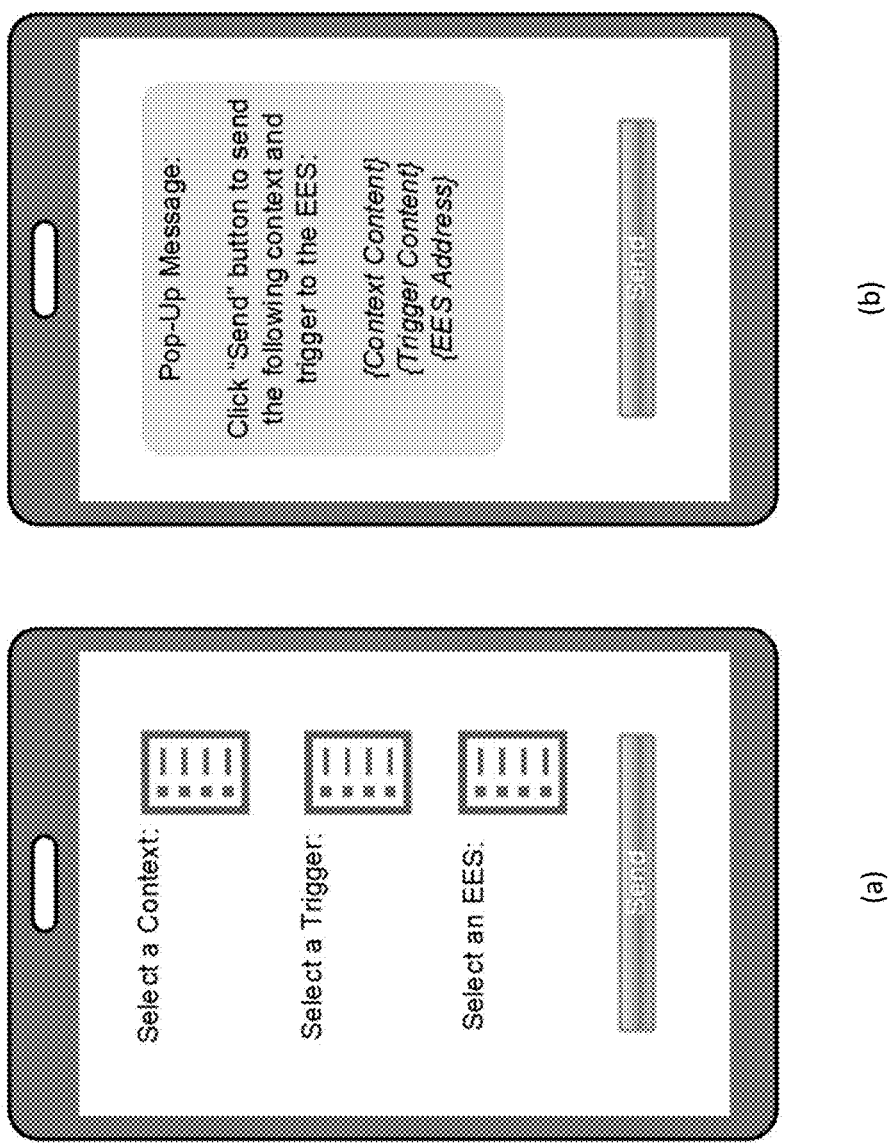
FIG. 24 illustrates a UE user interface for UE context/trigger collection.

FIG. 24 shows an example of a UE user interface for UE context/trigger collection 2400. In (a), a user can manually select context and trigger to be sent to an EES, which can also be designated by the user. After the user selects context, trigger and the EES, the user simply clicks "Send" button and the selected context and trigger may be sent to the selected EES. In (b), UE automatically generates pop-up message. Each message asks a user to send selected context and trigger to selected EES by clicking "Send" button. In this case, the user does not need to manually pick context, trigger, and/or EES.

Figure 25:
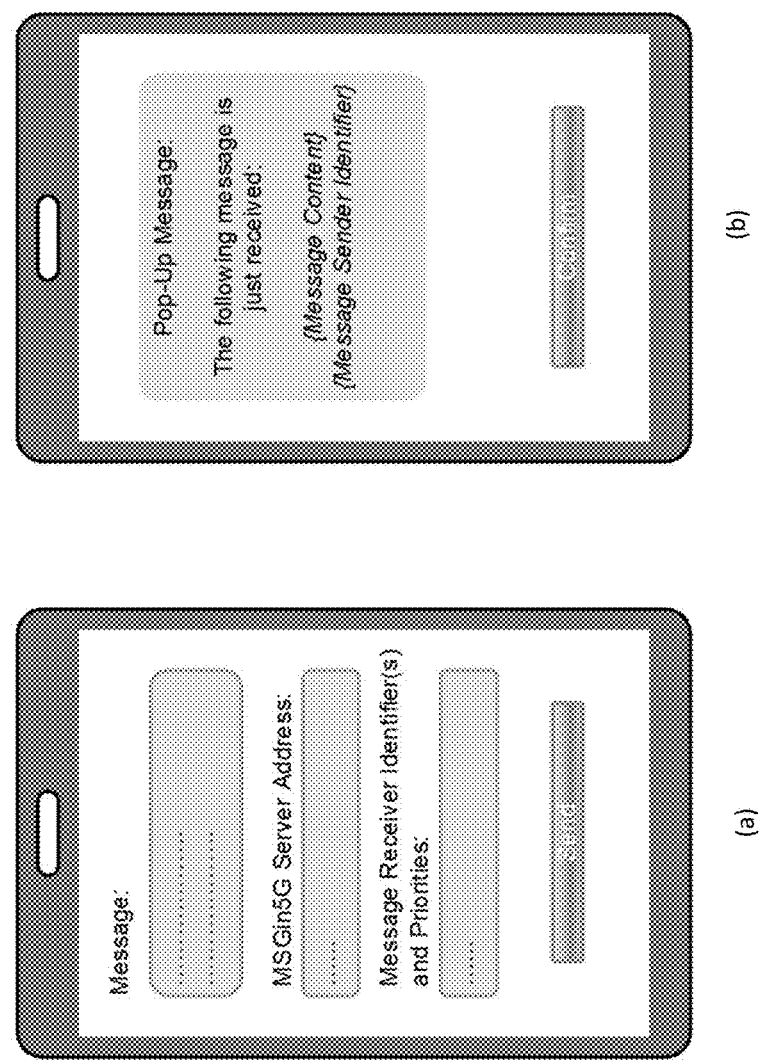
FIG. 25 illustrates a UE user interface for MSGin5G message delivery.

FIG. 25 shows an example of a UE user interface for MSGin5G sender and receiver 2500. As shown in (a), a MSGin5G sender first can indicate the message content, MSGin5G service address, and message receiver identifier(s) and priorities; then the user clicks "Send" button to send the message to the MSGin5G Service, where the message may be delivered to message receivers. As (b), when a message is delivered to a MSGin5G receiver, a message may be popped up on UE's screen showing the received message content and message sender identifier; then the receiver can click "Confirm" button to confirm the received message and trigger to send a response message towards the message sender.

Figure 26:
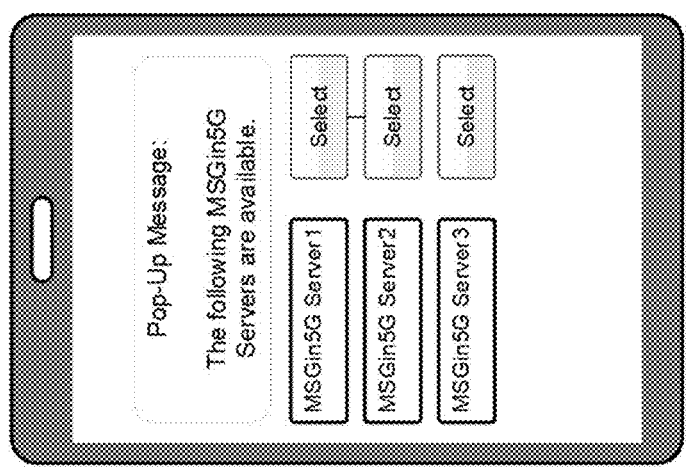
FIG. 26 illustrates a UE user interface for MSGin5G server indication.

FIG. 26 shows an example user interface 2600. In addition, 5GC may push some assigned MSGin5G Server to a UE when UE performs registration, registration update, configuration update, or established PDU session with 5GC. In this case, those assigned MSGin5G Severs can be popped up on UE's screen to allow a user to select one.

The following is a list of acronyms that may appear in the above description. Unless otherwise specified, the acronyms used herein refer to the corresponding term listed below:

| | |
| --- | --- |
| 5G | Fifth Generation |
| 5GC | 5G Core Network |
| 5GS | 5G System |
| AF | Application Function |
| AMF | Access Management Function |
| AN | Access Network |
| CNF | Centralized Network Function |
| DNF | Distributed Network Function |
| EAC | Edge Application Client |
| EAS | Edge Enabler Server |
| EEC | Edge Enabler Client |
| EES | Edge Enabler Server |
| ENC | Edge Network Controller |
| ENRF | Edge Network Repository Function |

-continued

| | |
|---|---|
| GUAMI | Globally Unique AMF ID |
| GUTI | Globally Unique Temporary Identifier |
| MEC | Multi-access Edge Computing |
| MSGin5G | Message Service within the 5G Systems |
| NEF | Network Exposure Function |
| NF | Network Function |
| NFD | Network Function Distribution |
| NFDM | Network Function Distribution Manager |
| NFV | Network Function Virtualization |
| NFVO | NFV Orchestrator |
| NRF | Network Repository Function |
| NSSAI | Network Slice Selection Assistance Information |
| NWDAF | Network Data Analytics Function |
| OAM | Operations, Administration and Maintenance |
| SBA | Service-Based Architecture |
| SBI | Service-Based Interface |
| SCP | Service Communication Proxy |
| SCS | Service Capability Server |
| SMF | Session Management Function |
| S-NSSAI | Single Network Slice Selection Assistance Information |
| SUPI | Subscription Permanent Identifier |
| UDM | Unified Data Management |
| UE | User Equipment |
| UPF | User Plane Function |
| VNF | Virtual Network Function |

What is claimed:

1. An apparatus for an edge network repository function, the apparatus comprising circuitry configured to:
receive a first request from a first edge network controller to register to the edge network repository function, wherein the first request comprises an identifier of the first edge network controller and identifiers of available edge servers in a first edge network associated with the first edge network controller;
store the identifiers of the first edge network controller and the available edge servers in the first edge network;
send a response to the first edge network controller indicating registration results;
receive a second request from a second edge network controller to register to the edge network repository function, wherein the second request comprises an identifier of the second edge network controller and identifiers of available edge servers in a second edge network associated with the second edge network controller;
store the identifiers of the second edge network controller and the available edge servers in the second edge network;
send a response to the second edge network controller indicating the registration results;
receive from a third edge network controller, associated with a third edge network, a request to discover other edge networks, wherein the request comprises a discovery filter specifying one or more edge server identifiers;
determine, based on the discovery filter, that at least the first edge network or the second edge network has at least one edge server matching the edge server identifiers specified in the discovery filter; and
send a discovery response to the third edge network controller comprising an identifier of at least the first edge network controller or the second edge network controller.

2. The apparatus of claim 1, wherein at least one of the first request or the second request comprises an edge network identifier.

3. The apparatus of claim 1, wherein at least one of the first request or the second request comprises an edge network name.

4. The apparatus of claim 1, wherein at least one of the first request or the second request comprises network addresses of edge servers in the first or second edge networks.

5. The apparatus of claim 1, wherein the discovery filter comprises a required location of edge networks to be discovered.

6. The apparatus of claim 1, wherein the discovery filter comprises a type of application or service which the edge networks or edge servers provide.

7. A method for an edge network repository function, the method comprising:
receiving a first request from a first edge network controller to register to the edge network repository function, wherein the first request comprises an identifier of the first edge network controller and identifiers of available edge servers in a first edge network associated with the first edge network controller;
storing the identifiers of the first edge network controller and the available edge servers in the first edge network;
sending a response to the first edge network controller indicating the registration results;
receiving a second request from a second edge network controller to register to the edge network repository function, wherein the second request comprises an identifier of the second edge network controller and identifiers of available edge servers in a second edge network associated with the second edge network controller;
storing the identifiers of the second edge network controller and the available edge servers in the second edge network;
sending a response to the second edge network controller indicating the registration results;
receiving from a third edge network controller, associated with a third edge network, a request to discover other edge networks, wherein the request comprises a discovery filter specifying one or more edge server identifiers;
determining, based on the discovery filter, that at least the first edge network or the second edge network has at least one edge server matching the edge server identifiers specified in the discovery filter; and
sending a discovery response to the third edge network controller comprising an identifier of at least the first edge network controller or the second edge network controller.

8. The method of claim 7, wherein at least one of the first request or the second request comprises an edge network identifier.

9. The method of claim 7, wherein at least one of the first request or the second request comprises an edge network name.

10. The method of claim 7, wherein at least one of the first request or the second request comprises network addresses of edge servers in the first or second edge networks.

11. The method of claim 7, wherein the discovery filter comprises a required location of edge networks to be discovered.

12. The method of claim 7, wherein the discovery filter comprises a type of application or service which the edge networks or edge servers provide.

* * * * *